US009561852B1

(12) United States Patent
Beaman et al.

(10) Patent No.: US 9,561,852 B1
(45) Date of Patent: Feb. 7, 2017

(54) IN FLIGHT TRANSFER OF PACKAGES BETWEEN AERIAL DRONES

(71) Applicant: International Business Machines Corporation, Armonk, NY (US)

(72) Inventors: Brian S. Beaman, Apex, NC (US); Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 14/987,155

(22) Filed: Jan. 4, 2016

(51) Int. Cl.
*G05D 1/00* (2006.01)
*B64D 1/00* (2006.01)
*B64C 39/02* (2006.01)

(52) U.S. Cl.
CPC ............. *B64D 1/00* (2013.01); *B64C 39/024* (2013.01); *B64C 2201/024* (2013.01); *B64C 2201/108* (2013.01); *B64C 2201/128* (2013.01); *B64C 2201/141* (2013.01)

(58) Field of Classification Search
CPC .......... B64C 39/02; B64C 39/024; B64C 1/22; B64C 1/00; B64C 1/12
USPC ........... 701/11; 244/2, 5, 12.1, 137.1, 135 A
See application file for complete search history.

(56) References Cited

U.S. PATENT DOCUMENTS

| | | | | |
|---|---|---|---|---|
| 6,540,179 B2 * | 4/2003 | Henderson | ............ | B64C 39/024 244/110 E |
| 6,869,042 B2 * | 3/2005 | Harrison | ............... | B64C 39/024 244/110 R |
| 7,793,888 B2 * | 9/2010 | Padan | ...................... | B64D 1/00 244/118.1 |
| 8,056,860 B2 * | 11/2011 | Small | .................... | B64C 39/024 244/1 TD |
| 8,989,924 B2 * | 3/2015 | Seydoux | ................ | A63H 27/12 244/17.13 |
| 2012/0251280 A1 * | 10/2012 | Jaurand | .................... | B64D 1/12 414/507 |

OTHER PUBLICATIONS

Daniel B. Wilson, Guidance and Navigation for UAV Airborne Docking, roboticsproceedings.org, RSS 11, P17, 2006.

* cited by examiner

*Primary Examiner* — Thomas G Black
*Assistant Examiner* — Luke Huynh
(74) *Attorney, Agent, or Firm* — Cantor Colburn LLP; Damion Josephs

(57) ABSTRACT

Aspects include a system for transferring a payload between drones. The system includes a first drone having a first member and a first controller, the first member having a first coupling device on one end, the first member being configured to carry a payload, the first controller being configured to change a first altitude and orientation of the first drone. A second drone includes a second member and controller, the second member having a second coupling device on one end, the second member being configured to receive the payload, the second controller being configured to change a second altitude and orientation of the second drone. The controllers cooperate to change at least one of the first and second altitude, and the first and second orientation to operably engage the first coupling device to the second coupling device for transferring the payload from the first member to the second member.

20 Claims, 22 Drawing Sheets

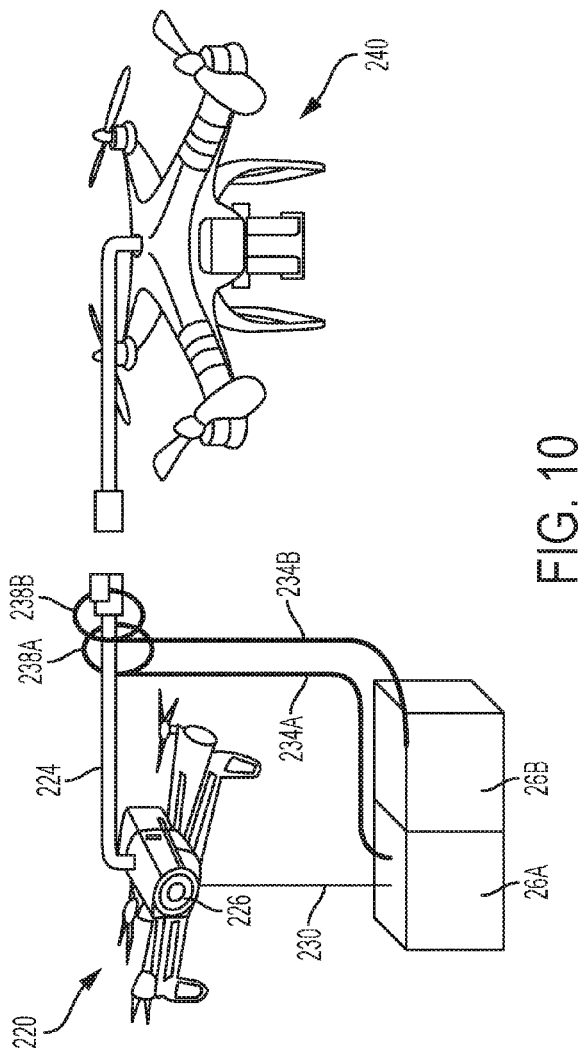
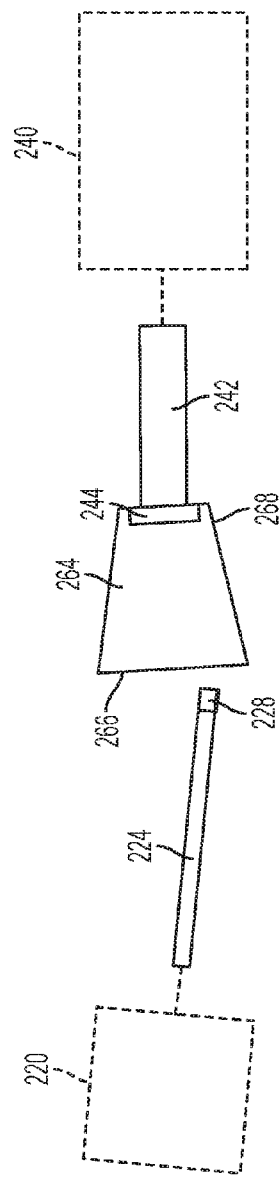
FIG. 10
FIG. 11

IN FLIGHT TRANSFER OF PACKAGES BETWEEN AERIAL DRONES

BACKGROUND

The present invention relates generally to a system and method for transferring packages and, more specifically, to a system and method for transferring packages between autonomous drones or unmanned aerial vehicles during flight.

Autonomous drones, also referred to as unmanned aerial vehicles (UAVs) and remotely piloted aircraft (RPA), are expected to be ruled eligible for use by private and corporate entities subject to pending to regulations implemented by various aviation authorities such as, for example, the Federal Aviation Admiration (FAA). Proposed uses for drones include, but are not limited to, city ordinance enforcement, other government functions, package delivery, and image capturing. Therefore, it is envisioned that users could purchase drones to achieve a certain set of needs or tasks such as delivering a payload from a warehouse to a customer.

SUMMARY

Embodiments include a system for transferring a payload from an originating drone to a receiving drone. The system includes a first aerial drone having a first transfer member and a first controller, the first transfer member having a first coupling device on one end, the first transfer member being configured to carry a payload, the first controller including a processor configured to change a first altitude and first orientation of the first aerial drone. A second aerial drone has a second transfer member and a second controller, the second transfer member having a second coupling device on one end, the second transfer member being configured to receive the payload, the second controller including a processor configured to change a second altitude and a second orientation of the second aerial drone. Wherein the first controller and the second controller cooperate to change at least one of the first altitude, the second altitude, the first orientation and the second orientation to operably engage the first coupling device to the second coupling device for transferring the payload from the first transfer member to the second transfer member while the first aerial drone and second drone are in-flight.

Further embodiments include an aerial drone. The aerial drone having a fuselage and a plurality of thrust producing devices coupled to the fuselage. A transfer member is coupled to the fuselage, the transfer member configured to move a payload to a second aerial drone. A controller is operably coupled to the plurality of thrust producing devices, the controller including a processor that is responsive to executable computer instructions to adjust the plurality of thrust producing devices to change at least one of an orientation and altitude of the transfer member to move the payload to the second aerial drone.

Still further embodiments include a method of in-flight transferring of a payload between aerial drones. The method includes providing a first aerial drone having a first transfer member. A second aerial drone is provided having a second transfer member. At least one of an altitude and an orientation is changed for at least one of the first aerial drone and the second aerial drone to position the first transfer member adjacent the second transfer member. The payload is moved from the first aerial drone to the second aerial drone.

Additional features are realized through the techniques of the present invention. Other embodiments and aspects of the invention are described in detail herein and are considered a part of the claimed invention. For a better understanding of the invention with the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features of embodiments of the invention are apparent from the following detailed description taken in conjunction with the accompanying drawings in which:

FIG. 10 depicts an in-flight package transfer of a payload between a pair of autonomous drones in accordance with an embodiment of this disclosure;

FIG. 11 depicts a transfer member coupling arrangement for use with a pair of autonomous drones in accordance with an embodiment of the invention;

DETAILED DESCRIPTION

Embodiments of the present disclosure are directed to a system for in-flight transferring of packages or payloads between a pair of autonomous drones. Embodiments of the present disclosure provide for the delivery of a payload beyond the range or authorized area of operation for a single autonomous drone. Some embodiments of the present disclosure further provide for cooperation between multiple autonomous drones in the delivery of a payload from an originating location, such as a warehouse for example, to a final destination, such as a customer's home for example.

Figure 1:
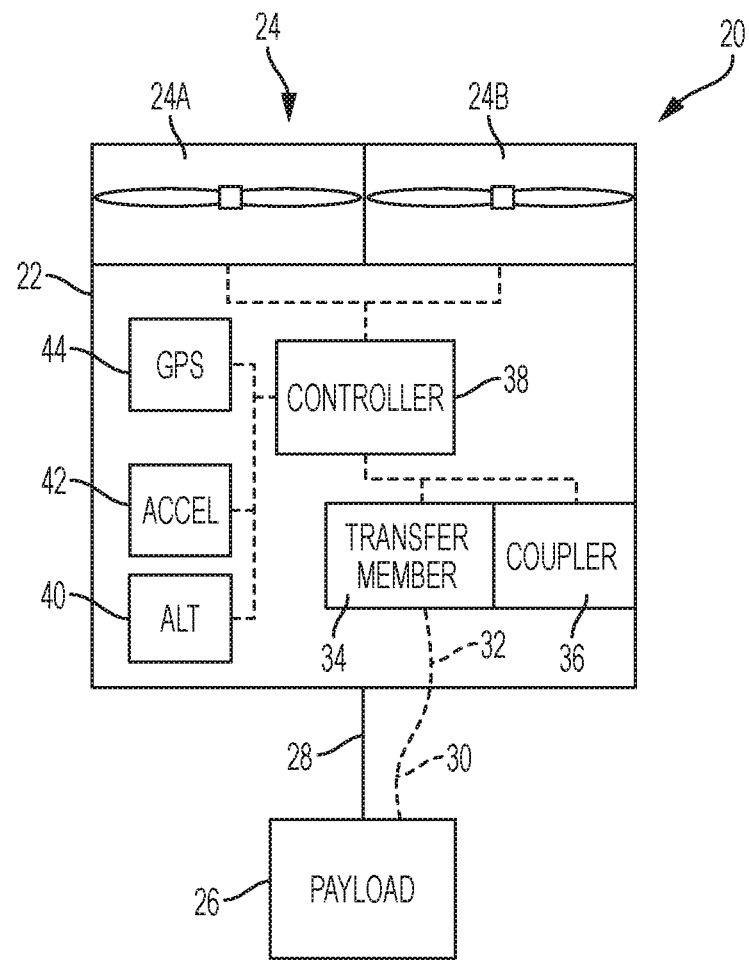
FIG. 1 depicts a block diagram of an autonomous drone in accordance with an embodiment of this disclosure.

Referring now to FIG. 1, an embodiment is shown of an autonomous drone 20 or unmanned aerial vehicle. As used herein, the term "drone" refers to an aerial vehicle capable to operating autonomously from a human operator to perform a predetermined function, such as deliver a payload or package for example. The drone 20 includes a fuselage 22 that supports at least one thrust device 24. In an embodiment, the drone 20 includes a plurality of thrust devices 24A, 24B, such as four thrust devices arranged about the periphery of the fuselage 22. In an embodiment, the thrust devices 24 include propeller member that rotates to produce thrust. The thrust devices 24 may be configurable to provide both lift (vertical thrust) and lateral thrust (horizontal thrust). The vertical and horizontal components of the thrust allow the changing of the altitude, lateral movement and orientation (attitude) of the drone 20.

In the exemplary embodiment, the fuselage 22 and thrust devices 24 are sized and configured to carry a payload 26 or package. The payload 26 being releasably coupled to the fuselage 22 by a first tether 28. As will be discussed in more detail herein, the payload 26 may also be coupled to a second tether 30. The second tether 30 is coupled on one end to the payload 26 and on an opposite end 32 to a transfer member 34. In the exemplary embodiment, the transfer member 34 is a transfer arm that extends from a side of the fuselage 22. In an embodiment, the transfer arm may be an expandable or extendable member that may be extended or retracted for the payload transfer process. The expandable transfer arm may be actuated by hydraulic, pneumatic, electromechanical (motor with a power screw) or with magnetic (solenoid or linear actuator) assemblies.

In an embodiment, the end 32 is movably or slidably coupled to the transfer member 34 to allow the end 32 to move from the transfer member 34 to another transfer member on another drone or a stationary docking station. In an embodiment, the movement of the end 32 is under the influence of gravity. In an embodiment, the transfer member 34 includes a coupling device 36. As discussed herein, in some embodiments the coupling device 36 engages a coupling device on another drone during the package transfer process to maintain the pair of drones in a fixed relationship during the transfer process. In the exemplary embodiment, the coupling device 36 is an electromagnet. In other embodiments the coupling device 36 may be any suitable mechanical, electromechanical or magnetic mechanism for engaging another drone.

The drone 20 includes a controller 38 having a processing circuit. The controller 38 may include processors that are responsive to operation control methods embodied in application code such as those shown in FIGS. 14-15. These methods are embodied in computer instructions written to be executed by the processor, such as in the form of software. The controller 38 is coupled transmit and receive signals from the thrust devices 24, the transfer member 34 and the coupling device 36 to determine and change their operational states (e.g. extend transfer member 34, change polarity of coupling device 36, adjust lift from thrust devices 24). The controller 38 may further be coupled to one or more sensor devices that enable to the controller to determine the position, orientation and altitude of the drone 20. In an embodiment, these sensors may include an altimeter 40, a gyroscope or accelerometers 42 or a global positioning satellite (GPS) system 44.

Figure 2:
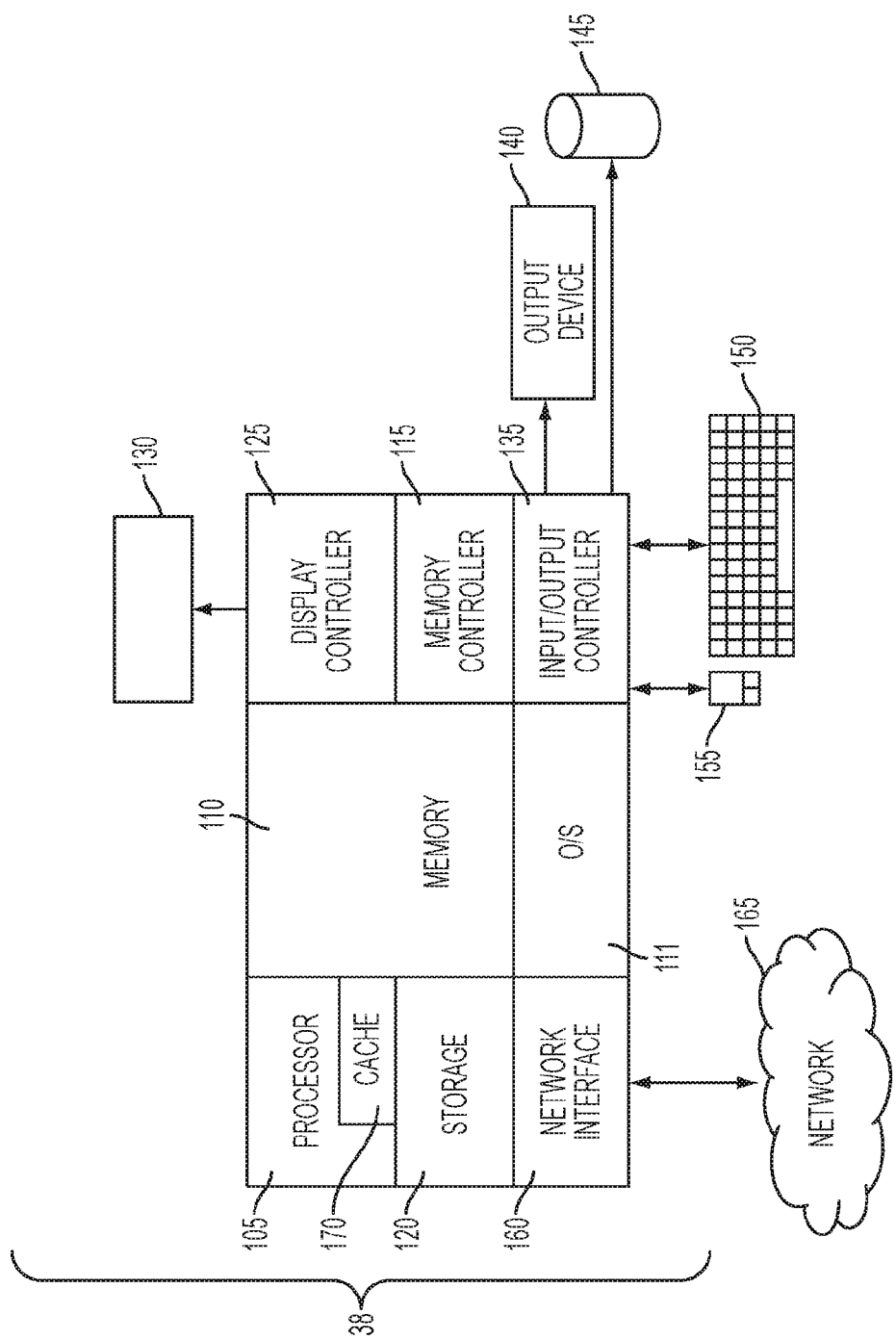
FIG. 2 depicts a block diagram of a controller for an autonomous drone in accordance with an embodiment of this disclosure.

FIG. 2 illustrates a block diagram of a controller 38 for use in implementing a system or method according to some embodiments. The systems and methods described herein may be implemented in hardware, software (e.g., firmware), or a combination thereof. In some embodiments, the methods described may be implemented, at least in part, in hardware and may be part of the microprocessor of a special or general-purpose controller 38, such as a personal computer, workstation, minicomputer, or mainframe computer.

In some embodiments, as shown in FIG. 2, the controller 38 includes a processor 105, memory 110 coupled to a memory controller 115, and one or more input devices 145 and/or output devices 140, such as peripheral or control devices, that are communicatively coupled via a local I/O controller 135. These devices 140 and 145 may include, for example, battery sensors, position sensors (altimeter 40, accelerometer 42, GPS 44), indicator/identification lights and the like. Input devices such as a conventional keyboard 150 and mouse 155 may be coupled to the I/O controller 135 when the drone is docked to allow personnel to service or input information. The I/O controller 135 may be, for example, one or more buses or other wired or wireless connections, as are known in the art. The I/O controller 135 may have additional elements, which are omitted for simplicity, such as controllers, buffers (caches), drivers, repeaters, and receivers, to enable communications.

The I/O devices 140, 145 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 105 is a hardware device for executing hardware instructions or software, particularly those stored in memory 110. The processor 105 may be a custom made or commercially available processor, a central processing unit (CPU), an auxiliary processor among several processors associated with the controller 38, a semiconductor based microprocessor (in the form of a microchip or chip set), a macroprocessor, or other device for executing instructions. The processor 105 includes a cache 170, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 170 may be organized as a hierarchy of more cache levels (L1, L2, etc.).

The memory 110 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, or other types of storage media. Note that the memory 110 may have a distributed architecture, where various components are situated remote from one another but may be accessed by the processor 105.

The instructions in memory 110 may include one or more separate programs, each of which comprises an ordered listing of executable instructions for implementing logical functions. In the example of FIG. 2, the instructions in the memory 110 include a suitable operating system (OS) 111. The operating system 111 essentially may control the execution of other computer programs and provides scheduling, input-output control, file and data management, memory management, and communication control and related services.

Additional data, including, for example, instructions for the processor 105 or other retrievable information, may be stored in storage 120, which may be a storage device such as a hard disk drive or solid state drive. The stored instructions in memory 110 or in storage 120 may include those enabling the processor to execute one or more aspects of the systems and methods of this disclosure.

The controller 38 may further include a display controller 125 coupled to a user interface or display 130. In some embodiments, the display 130 may be an LCD screen. In other embodiments, the display 130 may include a plurality of LED status lights. In some embodiments, the controller 38 may further include a network interface 160 for coupling to a network 165. The network 165 may be an IP-based network for communication between the controller 38 and an external server, client and the like via a broadband connection. In an embodiment, the network 165 may be a satellite network. The network 165 transmits and receives data between the controller 38 and external systems. In an embodiment, the external system may be another aerial drone or a drone docking system, wherein the transmitting and receiving of data allows the controller 38 to identify the other drone or docking system and determine when the payload is to be transferred to the other drone. In some embodiments, the network 165 may be a managed IP network administered by a service provider. The network 165 may be implemented in a wireless fashion, e.g., using wireless protocols and technologies, such as WiFi, WiMax, satellite, etc. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods according to this disclosure may be embodied, in whole or in part, in computer program products or in controller 38, such as that illustrated in FIG. 2.

Figure 3:
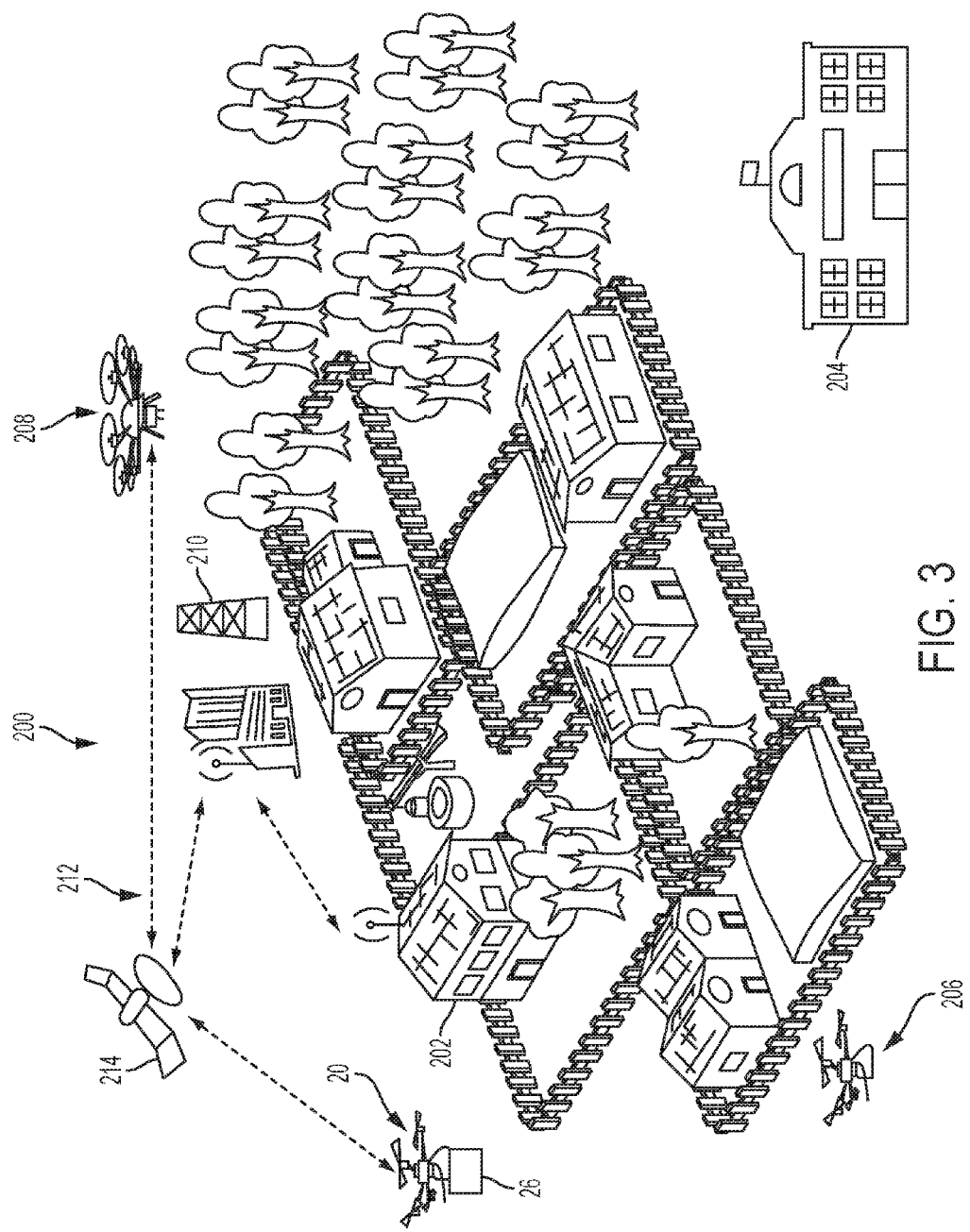
FIG. 3 depicts a perspective view of a package delivery system using an autonomous drone in accordance with an embodiment of this disclosure.
Figure 4:
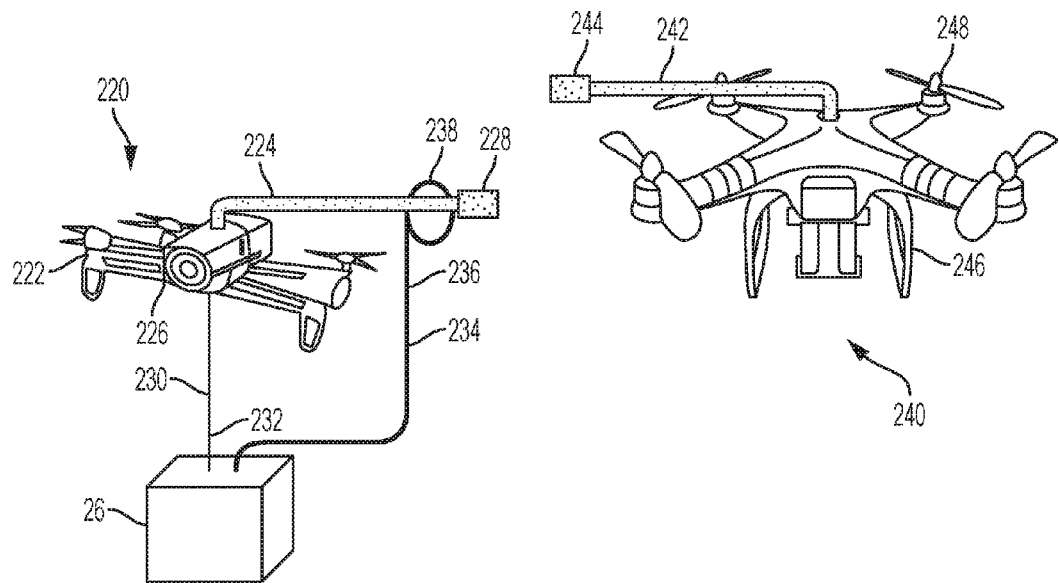
FIG. 4, FIG. 5, FIG. 6, and FIG. 7 depict an in-flight payload transfer sequence between a pair of autonomous drones in accordance with an embodiment of this disclosure.

Referring now to FIG. 3, an embodiment is shown of a package or payload delivery system 200 that uses autonomous drones, such as drone 20 for example, to deliver a payload from an originating location 202 (e.g. a warehouse) to a final destination 204 (e.g. a customer). In an embodiment, the system 200 is configured to provide delivery of the payload 26 to destination locations where the drone 20 that initially receives the payload is unable to complete the delivery. The drone 20 may be unable to complete the delivery for a variety of reasons, for example, the destination location 204 may be beyond the range of the drone 20 (e.g. too far way). The drone 20 may not be able to complete the delivery for other reasons as well; the use of the drone 20 may be restricted by governmental regulations or due to geographic restrictions by contracts between parties for example. In still other embodiments, the destination location 204 may only allow deliveries from approved drones.

In this embodiment, the system 200 provides for the in-flight transfer of the payload 26 from an initial drone 20 to one or more intermediate drones 206, 208 or a docking system 210. The system 200 provides for the in-flight transfer to allow the drones 20, 206, 208 to transfer the payload 26 without landing and therefore improving the efficiency of the delivery. In an embodiment, the system 200 includes a communication system 212 that allows the transmission of signals to the drones 20, 206, 208, such as through a satellite based communications link 214. It should be appreciated that the communications link 214 may be cellular, radio frequency or a mesh communications type network. The signals transmitted to the drones 20, 206, 208 may include locations to pick up, transfer or deliver the payload, or the size and weight of the payload for example. The signals transmitted to the drones 20, 206, 208 may further include identification information that allows the carrying drone (e.g. drone 20) to dynamically identify the receiving drone (e.g. drone 206) prior to engaging in the in-flight transfer process.

Referring now to FIGS. 4-7 an embodiment of a drone 220 is shown that is configured to carry a payload 26 and perform an in-flight transfer of the payload 26 to another drone 240 or a docking platform 210. The drone 220 as the original carrier of the payload 26 may be referred to as the originating drone. In this embodiment, the drone 220 includes a plurality of thrust devices 222 that provide lift, horizontal thrust and orientation control. A transfer arm 224 extends from the fuselage 226. It should be appreciated that the transfer arm 224 is positioned as to not interfere with the thrust devices 222. In the exemplary embodiment, the transfer arm 224 is extendable and retractable. In embodiments, this provides for a more aerodynamic profile and reduces drag to increase efficiency and range. On the end of the transfer arm 224 is a coupler device 228, such as an electromagnet. As discussed above the transfer arm 224 and coupler device 228 may be controlled by the controller 38. In an embodiment, the controller 38 may change the polarity of the electromagnet to allow the coupler device 228 to engage another coupler device.

The payload 26 is coupled to the fuselage 226 by a first tether 230. In an embodiment, the payload 26 is releasably coupled to the first tether 230, such as at end 232 for example. The release device for payload 26 may be reusable (e.g. a magnetic based system) or a one-time usage (e.g. the first tether 230 is severed or includes a frangible joint). The payload 26 is further coupled to a second tether 234. The second tether 234 includes an end 236 that is slidably coupled to the transfer arm 224. In an embodiment, the end 236 includes a capture ring 238. The capture ring 238 may be sized to allow the capture ring 238 to freely move along the length of the transfer arm 224.

In operation, the originating drone 220 receives a payload 26 (i.e. from a warehouse or another drone) and travels to the location of the transfer. In an embodiment, the originating drone 220 receives data, such as upon receiving the payload 26 or while enroute to the transfer location, that indicates the identity of the receiving drone 240 or docking platform 210. Upon reaching the transfer location, the originating drone 220 identifies the receiving drone 240. The identification may occur via radio frequency (RF) communication for example. In one embodiment, each of the drones 220, 240 have a transponder that communicates an identification signal. In an embodiment, the drones 220, 240 may include a radio frequency identification device (RFID) that transmits the identification signal. In other embodiments, the identification may occur optically, such as via a camera that is used to acquire images of the other drone and the markings are visually compared to determine identification. In still other embodiments, the drones 220, 240 may include lights or LED's that are used to transmit an identification signal to the other drones.

Figure 5:
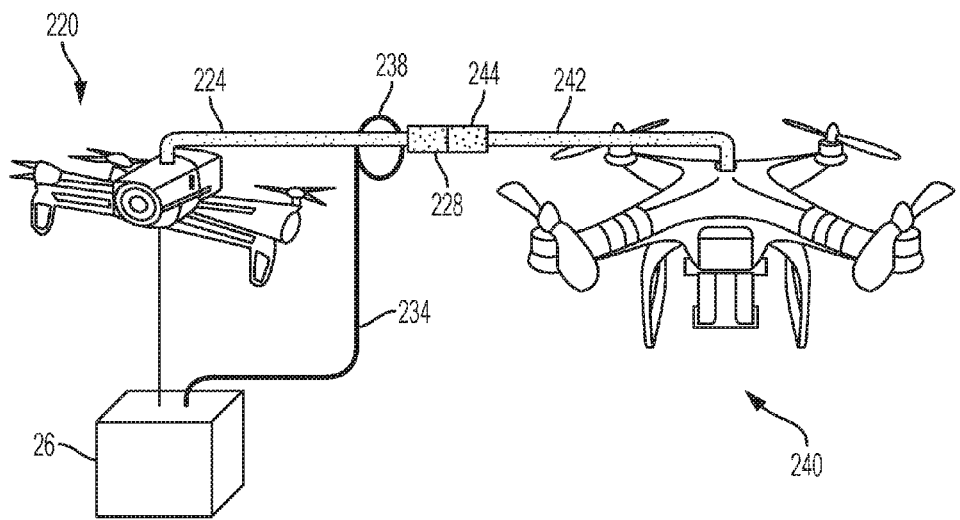
Figure 6:
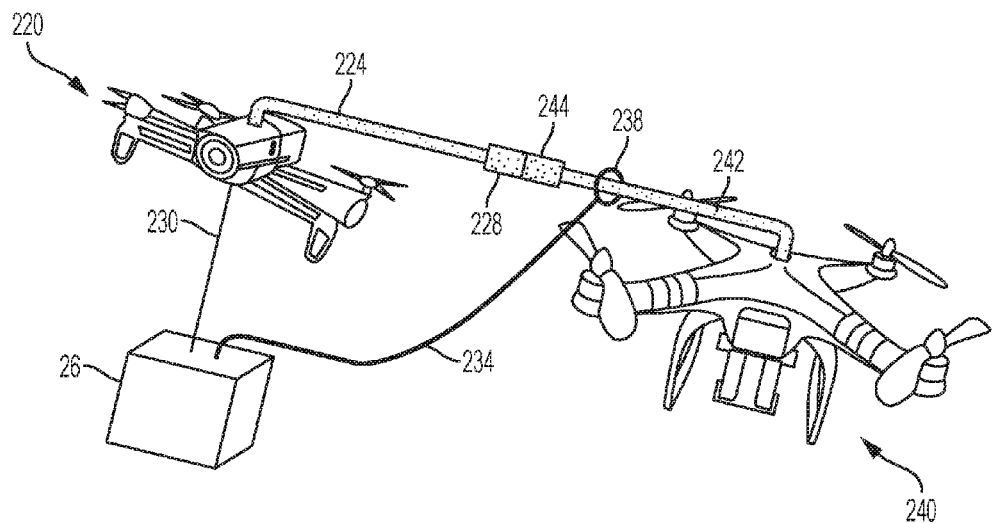

In this embodiment, the receiving drone 240 also includes a transfer arm 242 having a coupling device 244 arranged on the end. The transfer arm 242 may be extendible and retractable as discussed herein with respect to arm 224. Once the identification has been validated, the drones 220, 240 align their fuselages 226, 246 such that the transfer arms 224, 242 and coupling devices are aligned. The alignment of the transfer arms 224, 242 may be accomplished by adjusting the respective thrust devices 222, 248. Once aligned, the drones 220, 240 engage the coupling devices 228, 244 (FIG. 5). Once the coupling devices 228, 244 are engaged, the drones 220, 240 are fixedly coupled to each other. In an embodiment, the respective controllers 38 establish a communication linkage, such as via radio frequency or a data connection in the coupling devices 228, 244 for example, that allows the controllers 38 to cooperate and maintain a coordinated altitude and orientation.

At the point of engagement, the capture ring 238 is positioned on the transfer arm 224 of the originating drone 220. The drones 220, 240 then change their respective orientations (FIG. 6) to tilt or angle the coupled transfer arms 224, 242 to allow the capture ring 238 to move or slide along the length of the transfer arms 224, 242 from the transfer arm 224 to the transfer arm 242 under the influence of gravity. It should be appreciated that once the capture ring 238 moves, the payload 26 is coupled to the originating drone 220 by the first tether 230 and to the second drone 240 by the second tether 234.

In an embodiment, the controllers 38 determine the change in orientation to allow the capture ring 238 to move and for the payload to transfer based on the weight of the payload, a desired transfer rate, and a length of transfer. Other variables may include factors such as the coefficient of friction between the capture ring 238 and the transfer arms 224, 242. The controllers 38 then determine a mass transfer time-dependent differential vector. For example, it may be known that a 250 g payload is to be transferred at a rate of 3 cm/second over a span of 30 cm. From this differential vector, an orientation or altitude adjustment may be determined to provide a desired or predetermined transfer rate or dynamic load shifting. As discussed further herein, the drones 220, 240 may include dynamic counterbalancing. The determined differential vector may be used to determine the timing and amount of dynamic counterbalancing that is applied.

Figure 7:
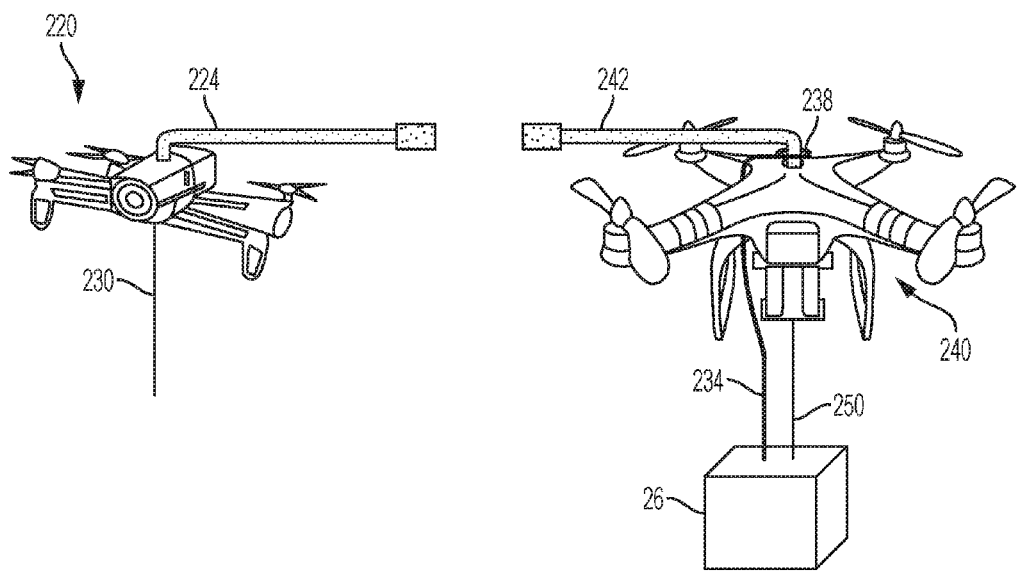

With the capture ring 238 moved, the drones 220, 240 again adjust their orientations, such as to a relatively horizontal position for example, and disengage the coupling devices 228, 244 (FIG. 7). The originating drone 220 may then release the payload 26 resulting in the payload 26 being coupled to the receiving drone 240 by the second tether 234. Once released, the payload 26 moves into alignment with the receiving drone 240. In an embodiment, the receiving drone 240 may couple a third tether 250 to secure the payload 26. The drones 220, 240 may then retract their respective transfer arms 224, 242 and proceed to their next destination.

It should be appreciated that the transferring of the payload 26 from the originating drone 220 to the receiving drone 240 results in a transfer of weight from one drone to the other. During the transition period during which the payload is being transferred, the center of gravity of each respective drone 220, 240 will be dynamically changing as the weight shifts from one drone to the other. In an embodiment, the controllers 38 compensate for the dynamic changing of the center of gravity by adjusting the thrust devices 222, 248. In an embodiment where the drones 220, 240 have a plurality of thrust devices 222, 248 (e.g. four thrust devices arranged about the periphery of the drone), the controllers 38 may adjust individual thrust devices 222, 248 differently and continuously during the transfer process of payload 26 to maintain a predetermined altitude and orientation.

Figure 8:
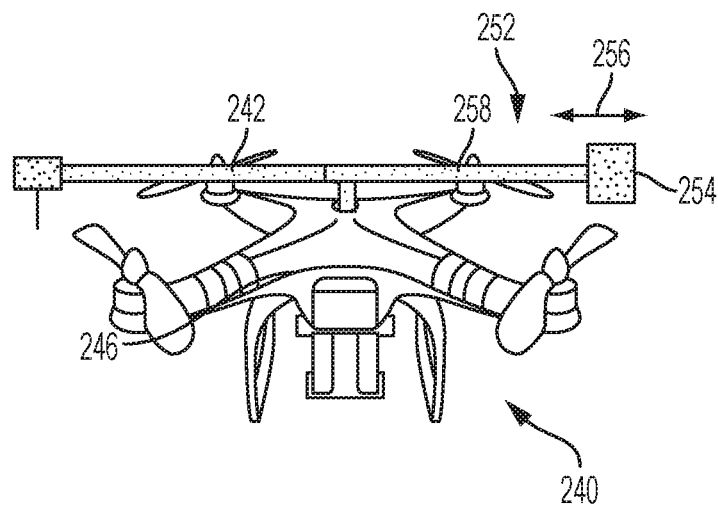
FIG. 8 depicts an autonomous drone having a dynamic counterbalancing system in accordance with an embodiment of this disclosure.

In another embodiment shown in FIG. 8, the drones include a dynamic counterbalance member 252 in the form of a second arm 258 that is arranged opposite the transfer arm 242. The second arm 258 may be extendable or retractable in the direction indicated by arrow 256. A weight member 254 is disposed on the end of the second arm 258. It should be appreciated that as the second arm 258 is extended further from the center of the fuselage 246, the center of gravity of the drone 240 will shift in the direction of the weight member 254. Since the weight of the payload 26 is being transferred onto the transfer arm 242, the controller 38 may extend or retract the second arm 258 to compensate for the payload 26 and maintain the center of gravity of the drone 240 in a desired location or range of locations.

Figure 9:
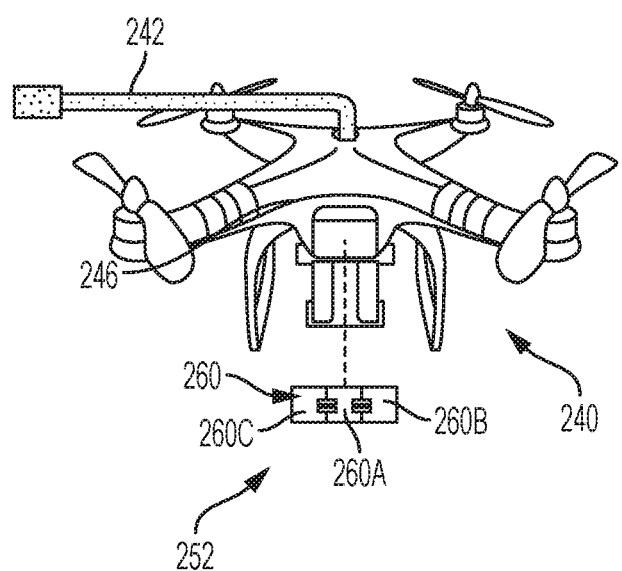
FIG. 9 depicts an autonomous drone having another dynamic counterbalancing system in accordance with an embodiment of this disclosure.

In another embodiment shown in FIG. 9, another the counterbalance member 252 is shown having a plurality of ballast tanks 260A, 260B, 260C that contain a balancing fluid. The ballast tanks 260A, 260B, 260C may be disposed within the fuselage 246 or suspended below the fuselage 246 for example. The counterbalance member 252 further includes pumps 262 that are configured to transfer a fluid between the center ballast tank 260A and the outer ballast tanks 260B, 260C. In this embodiment, to compensate for the weight from the payload 26, the controller 38 may activate the pumps 260 to move fluid from the center ballast tank 260A to one or more of the outer ballast tanks 260B for example, to maintain the center of gravity in a desired location. In the illustrated embodiment, as the weight of the payload 26 is transferred onto the transfer arm 242, the fluid is moved from the ballast tank 260A, 260C towards the ballast tank 260B.

In an embodiment, the drone may use a combination of the above counterbalancing arrangements during operation.

It should be appreciated that while embodiments herein describe and illustrate the transfer process with respect to a single payload 26, in other embodiments, the transfer process may include multiple payloads. Referring now to FIG. 10, an embodiment is shown wherein the originating drone 220 is carrying multiple payloads 26A, 26B. Each of the payloads 26A, 26B may be individually coupled to the fuselage 226 by the first tether 230, or may be jointly coupled. Each payload 26A, 26B is coupled by a separate second tether 234A, 234B. Each second tether 234A, 234B includes a capture ring 238A, 238B. To transfer the payloads 26A, 26B, the drones 220, 240 perform the steps discussed herein with respect to FIGS. 4-7. It should be appreciated however, that the drones 220, 240 may also be configured to transfer one of the payloads, such as payload 26B for example, from the originating drone to the receiving drone 240. In an embodiment, the capture rings 238A, 238B may be selectively coupled to the transfer arm 224 to retain the capture ring and prevent it from moving onto the transfer arm of the receiving drone 240. In this manner, the retained payload (e.g. payload 26A) may be retained on the originating drone 220 while the other payload (e.g. payload 26B) is transferred to the receiving drone 240.

Referring now to FIG. 11 an embodiment of an arrangement for engaging the coupling devices 228, 244. In this embodiment, the end of the transfer arm 242 of the receiving drone 240 includes a cone member 264. The cone member 264 has a generally frustoconical shaped interior having a distal end 266 that is larger than the end 268 proximate the coupling device 244. In this embodiment, as the drones 220, 240 approach each other, the transfer arm 224 and the coupling device 228 are received by the end 266 of the cone member 264. The angled shape of the frustoconical inner surface guides the coupling device 228 towards the coupling devices 244. This provides advantages in completing the engagement of the coupling devices 228, 244 in the event there is a misalignment of the drones 220, 240.

Figure 12A:
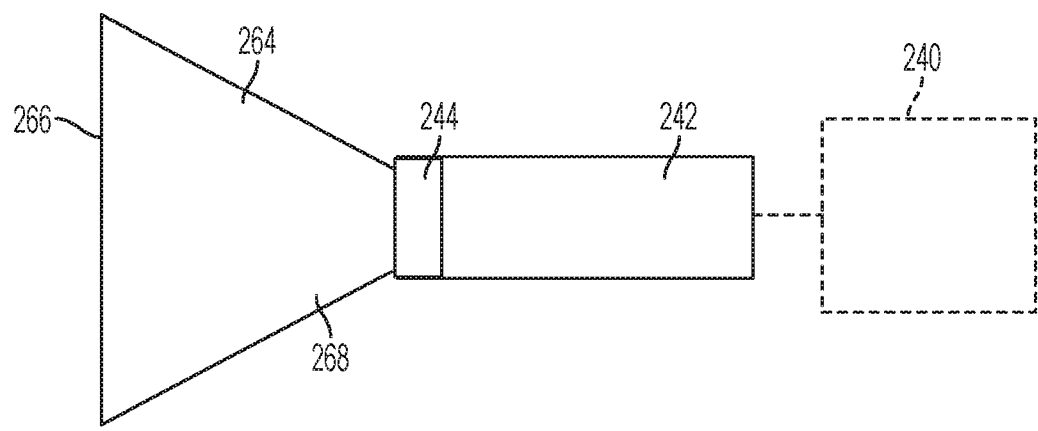
FIG. 12A, FIG. 12B and FIG. 12C depict a transfer member coupling arrangement for use with a pair of autonomous drones in accordance with an embodiment of the invention.
Figure 12B:
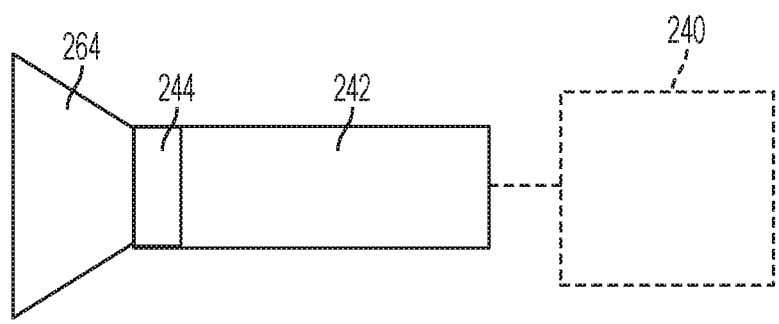
Figure 12C:
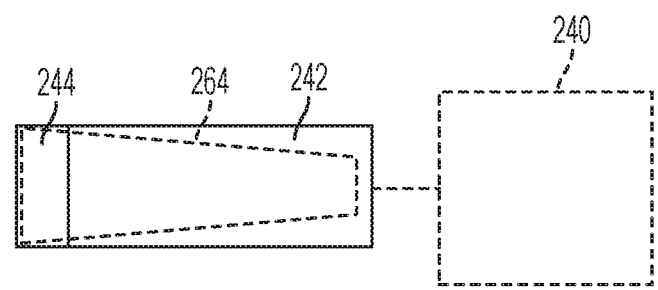
Figure 13A:
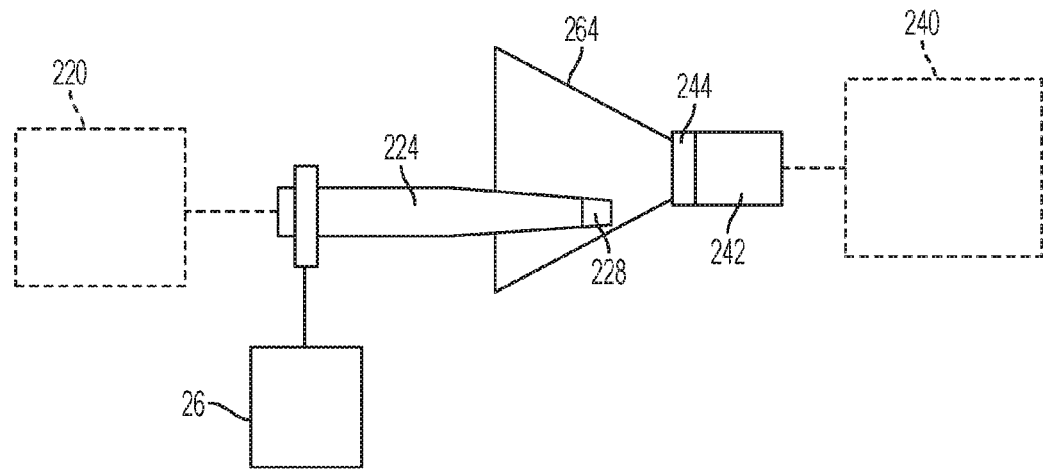
FIG. 13A and FIG. 13B depict a transfer member coupling arrangement for use with a pair of autonomous drones in accordance with an embodiment of the invention.
Figure 13B:
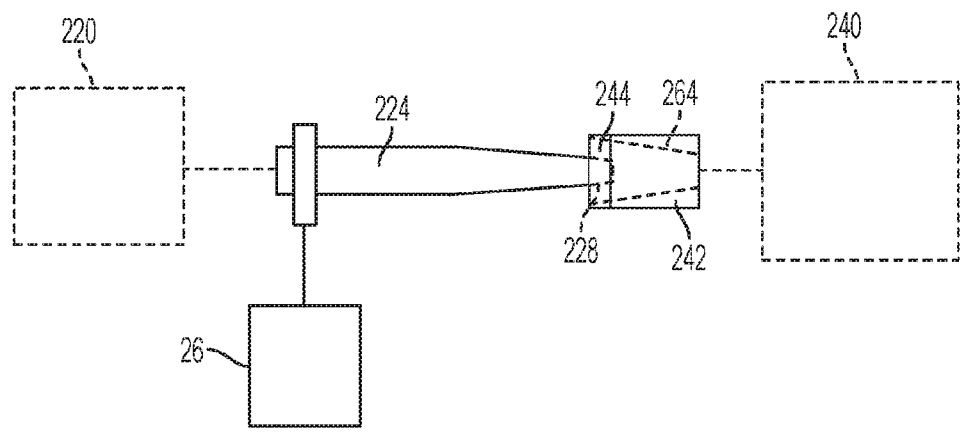

Referring now to FIG. 12A, FIG. 12B and FIG. 12C another embodiment is shown of an arrangement for facilitating the coupling of devices 228, 244. In this embodiment, the cone member 264 may include a substantially solid outer cone made from an elastomeric plastic. In an embodiment, the cone member 264 may be reinforced with springs to keep the cone member 264 open. In still another embodiment, the cone member 264 may include substantially rigid parallel/co-axial armatures with webbing arranged between the arms. The arms may be gimbally disposed so that each arm extends/collapses towards the long axis of the cone as the arms are extended/retracted with respect to the housing of the transfer arm 242. In this embodiment, when the drones 220, 240 are to couple, the drone 240 extends the cone member 264 (FIG. 12A). The cone member 264 has a generally frustoconical shaped interior having a distal end 266 that is larger than the end 268 proximate the coupling device 244. The frustoconical shape of the cone member guides the coupling device 228 towards the coupling device 244 (FIG. 13A). After the coupling device 228 is coupled to the device 244, the drone 240 may retract the cone member 264 (FIG. 12B) until the cone member 264 is disposed within transfer arm 242 (FIG. 12C, FIG. 13B). With the coupling devices 228, 244 connecting the drones 220, 240, the transfer of the payload 26 may be initiated.

Figure 14A:
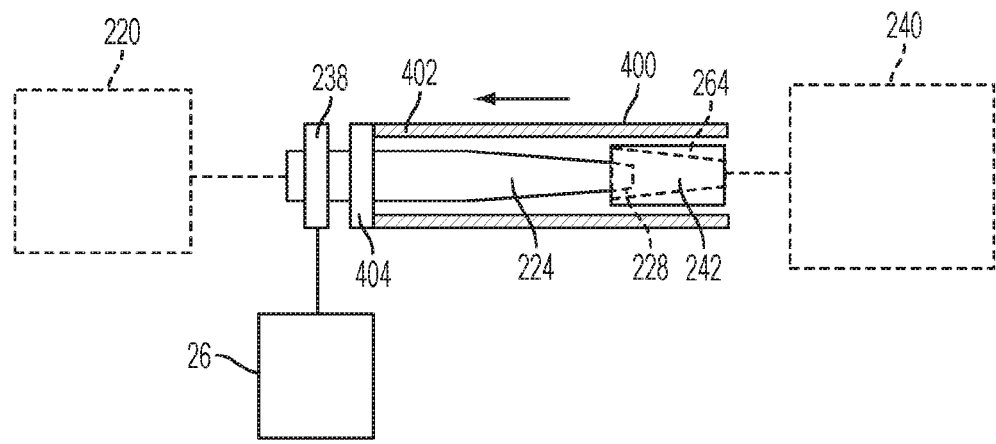
FIG. 14A, FIG. 14B, FIG. 14C and FIG. 14D depict a transfer member coupling arrangement for use with a pair of autonomous drones in accordance with an embodiment of the invention.
Figure 14B:
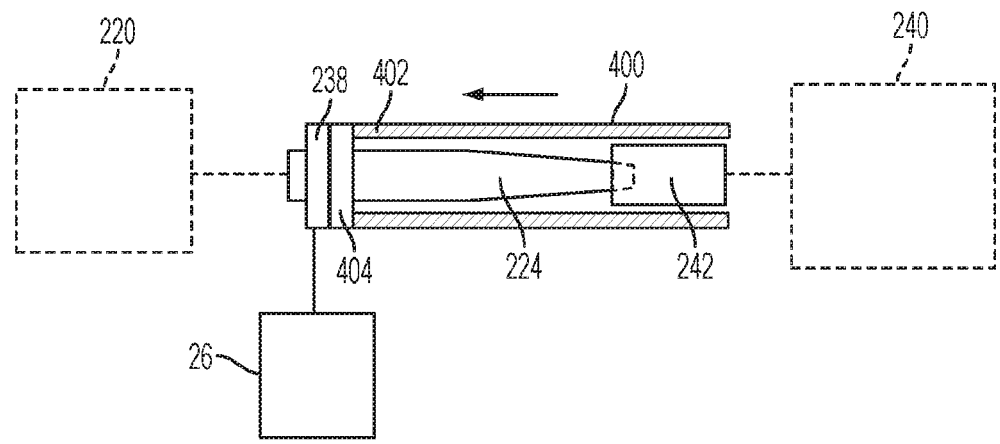

Referring now to FIG. 14A, an embodiment of a system is shown for assisting the transfer of the payload 26 from the originating drone 220 to the receiving drone 240. In this embodiment, the receiving drone 240 includes a transfer sleeve 400 that moves from a retracted position (e.g. within a housing on the drone 240) to an extended position. The transfer sleeve 400 is generally tubular in shape having a hollow interior that is sized to receive the transfer arm 242. On an end 402, the transfer sleeve 400 includes a pickup member 404 that moves with the transfer sleeve 400 as the transfer sleeve is extended and retracted. The transfer sleeve 400 is sized to extend over the transfer arm 224 (FIG. 14A) until the pickup member 404 is proximate the capture ring 238 (FIG. 14B).

Figure 14C:
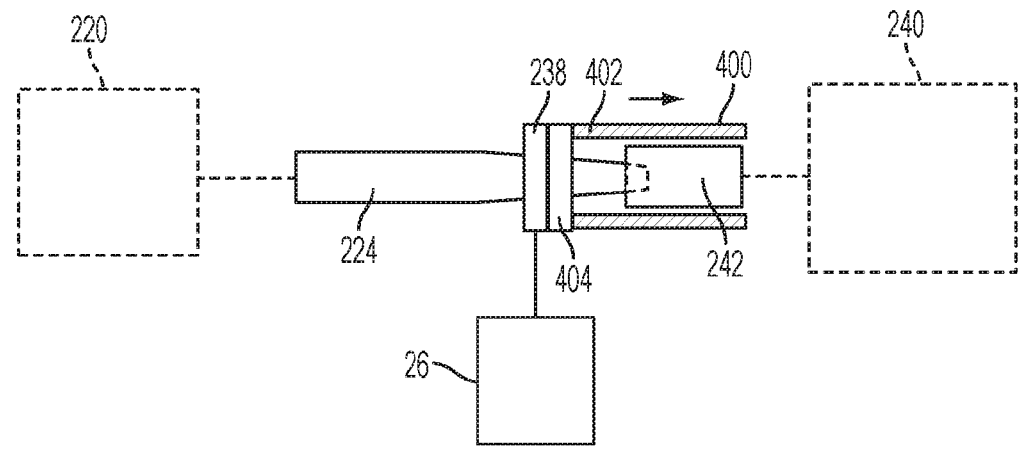
Figure 14D:
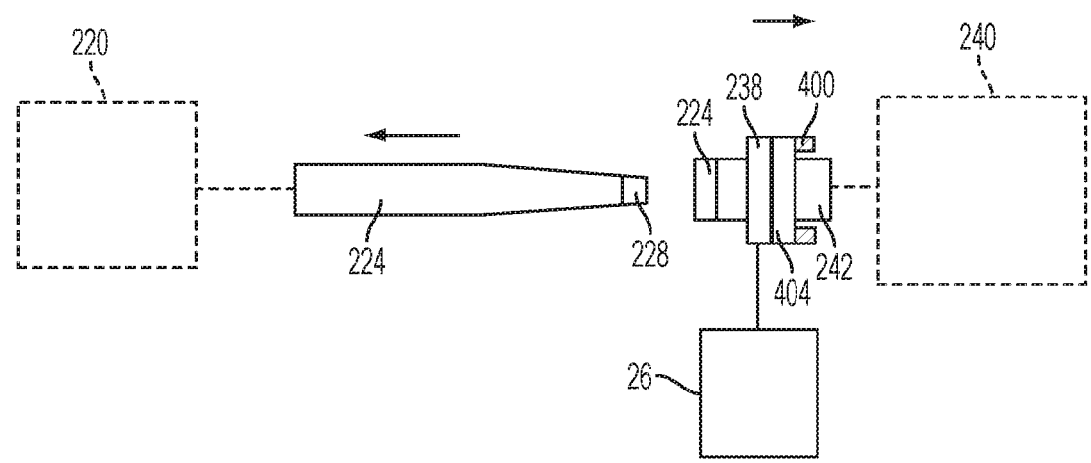

In an embodiment, the pickup member 404 and the capture ring 238 are configured to interlock and couple when the members 404, 406 are proximate each other. In one embodiment, the interlock may be formed by an electromagnet. In another embodiment, the interlock may be formed by a mechanical means, such as a spring-loaded latch for example. Once the member 404 and capture ring 238 are interlocked, the transfer sleeve is retracted such that the end 402 moves towards the fuselage of the drone 240. As the transfer sleeve 400 is retracted, the interlocking of the member 404 and capture ring 238 causes the payload 26 to move away from the originating drone 220 and towards the receiving drone 240 (FIG. 14C). In one embodiment, the use of the transfer sleeve 400 allows for the transfer of the payload from the originating drone 220 to the receiving drone 240 without reorienting (angling) the drones 220, 240. In another embodiment, the use of the transfer sleeve 400 reduces the amount of orientation change used in the transfer process.

When the transfer sleeve 400 is fully retracted (FIG. 14D), the member 404 and capture ring 238 are disposed on the transfer arm 242 and the transfer of the payload 26 from the originating drone 220 to the receiving drone 240 is completed. The coupling device 228 may then disengage from the coupling device 244 allowing the drones 220, 240 to separate. The payload 26 may then be secured to the receiving drone 240 as discussed herein.

Figure 15A:
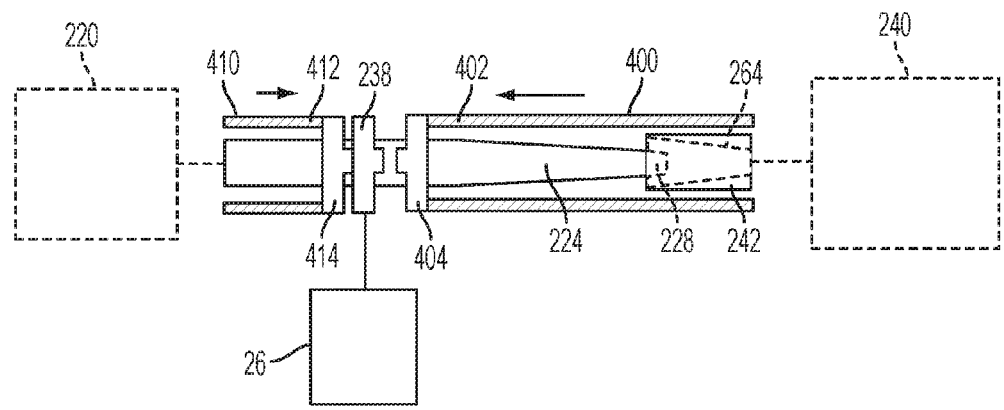
FIG. 15A, FIG. 15B, FIG. 15C and FIG. 15D depict a transfer member coupling arrangement for use with a pair of autonomous drones in accordance with an embodiment of the invention.

Referring now to FIG. 15A, another embodiment is shown for transferring the payload 26 from the originating drone 220 to the receiving drone 240. This embodiment is similar to that of FIG. 14A with the receiving drone 240 having a transfer sleeve 400 that is extendable and retractable over the transfer arms 224, 242. The transfer sleeve 400 includes a pickup member 404 disposed on an end 402. In this embodiment, the originating drone 220 also includes a transfer sleeve 410. The transfer sleeve 410 is also movable between an extended position and a retracted position. On one end 412, a pickup member 414 is coupled to the transfer sleeve 410. The transfer sleeve 410 is generally tubular in shape having a hollow interior that is sized to receive the transfer arm 224.

In the exemplary embodiment, the pickup member 414 includes an interlock device, such as an electromagnet or a mechanical locking means (e.g. a spring-loaded latch) for example, that couples the pickup member 414 to the capture ring 238 (FIG. 15A). As the transfer sleeve 410 moves from the retracted position to the extended position, the capture ring 238, and thus the payload 26 are moved along the transfer arm 224. When the originating drone 220 is coupled to the receiving drone 240, the capture ring 238 and payload 26 are moved towards the receiving drone 240. It should be appreciated that movement of the capture ring 238 with the pickup member 414 may also be used at the point of delivery to slide the capture ring 238 off the transfer arm 224 to disconnect the payload 26 from the originating drone 220.

Figure 15B:
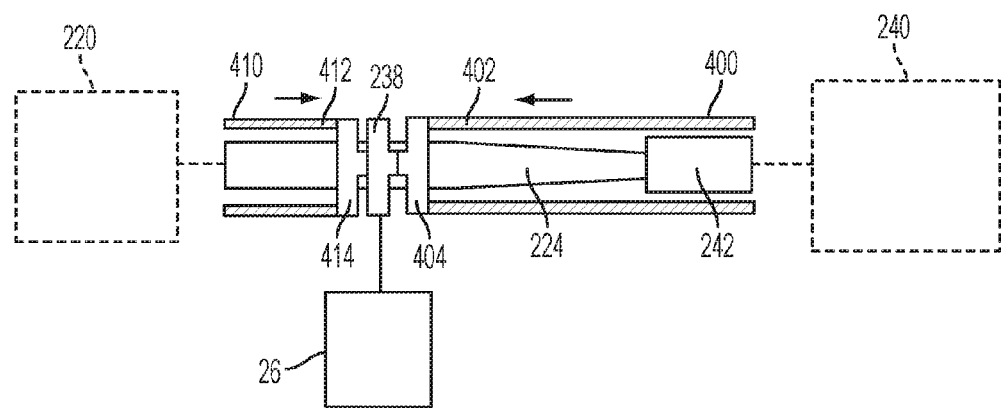
Figure 15C:
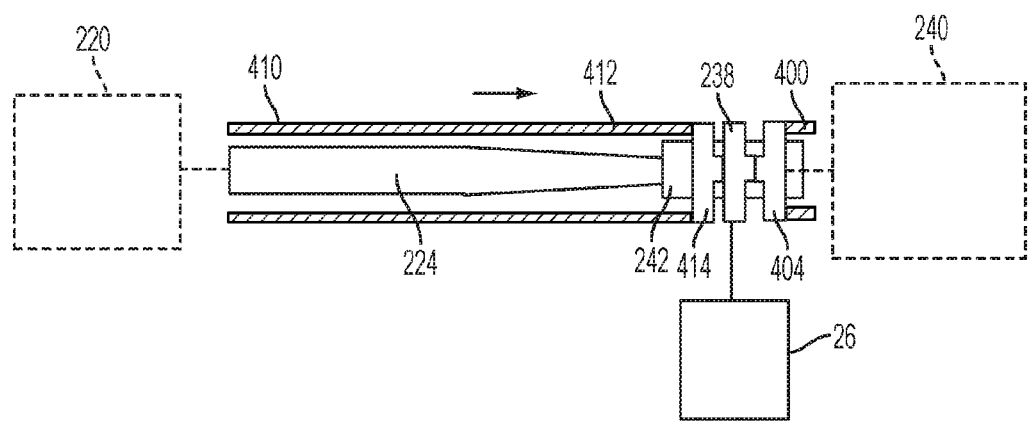
Figure 15D:
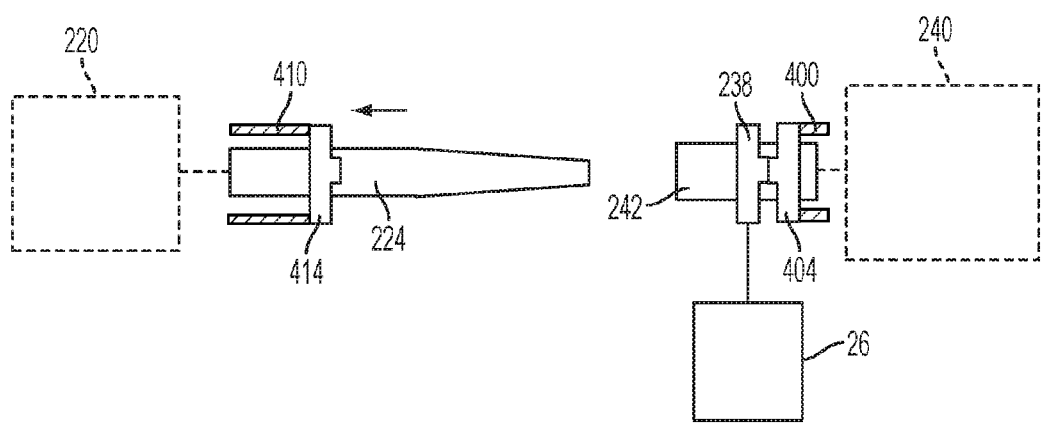

As the capture ring 238 is moved it will come into contact with the pickup member 404 from the receiving drone (FIG. 15B). The interlock device of pickup member 404 (e.g. an electromagnet) couples with the capture ring 238 resulting in the capture ring 238 being coupled to both pickup members 404, 414. Once the capture ring 238 is coupled to the pickup members 404, 414, the transfer sleeve 410 continues to extend while the transfer sleeve 400 retracts. This allows the movement of the capture ring 238 from the transfer arm 224 onto the transfer arm 242 (FIG. 15C). At this point, the weight of payload 26 has been transferred from the originating drone 220 to the receiving drone 240.

When the transfer sleeve 400 is fully retracted (FIG. 15D), the member 404 and capture ring 238 are disposed on the transfer arm 242 and the transfer of the payload 26 from the originating drone 220 to the receiving drone 240 is completed. The coupling device 228 may then disengage from the coupling device 244 allowing the drones 220, 240 to separate. The payload 26 may then be secured to the receiving drone 240 as discussed herein.

Figure 16:
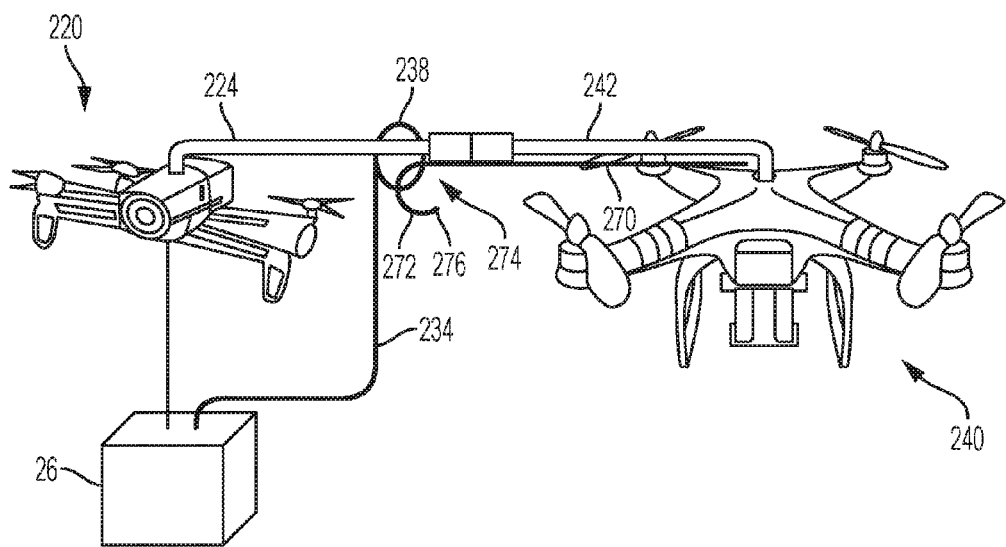
FIG. 16 depicts another transfer member coupling arrangement for use with a pair of autonomous drones in accordance with an embodiment of the invention.

Referring now to FIG. 16 another embodiment of a system for moving the capture ring 238 from the originating drone 220 to the receiving drone 240 without using or without relying on gravity. In this embodiment, the receiving drone 240 includes a hook member 270 that extends from or along the transfer arm 242. The hook member 270 includes a curved end 272 having an end 276 that defines an open section 274. In this embodiment, when the transfer arms 224, 242 are engaged, the hook member 270 extends and routes the end 276 through the opening defined by the capture ring 238. This allows the capture ring 238 to pass through the open section 274 and be captured by the hook member 270. The hook member 270 may then be retracted resulting in the loop member being moved from the transfer arm 224 of the originating drone 220 to the transfer arm 242 of the receiving drone 240.

It should be appreciated that other mechanisms may be used to transfer the capture ring 238, such as but not limited to a conveyor means, a motor-driven means, a pulley system, an electromagnetic means and other mechanical means.

Figure 17:
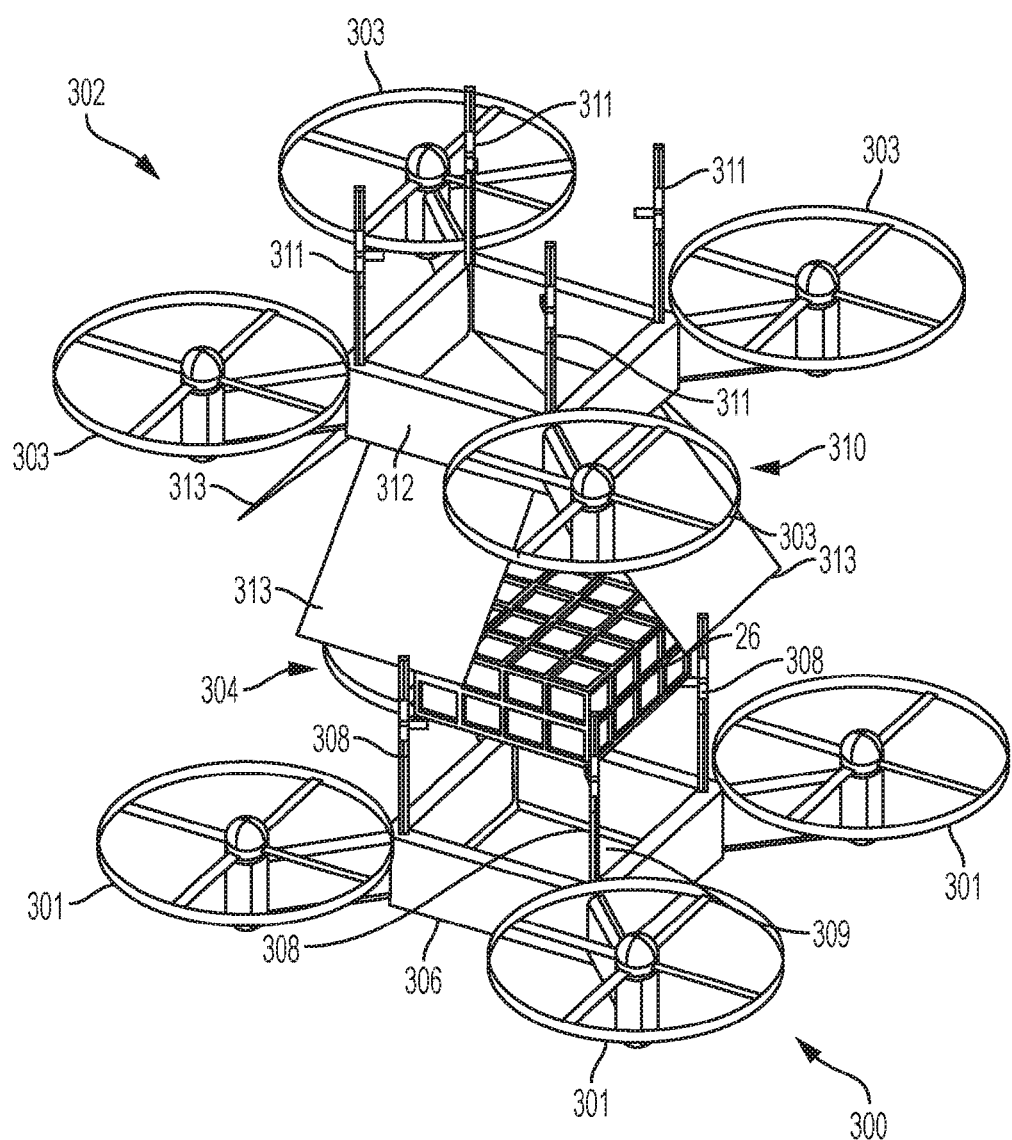
FIG. 17 depicts an in-flight transfer of a payload between a pair of autonomous drones in accordance with an embodiment of this disclosure.

Referring now to FIG. 17 another embodiment is shown for transferring a payload 26 from an originating drone 300 to a receiving drone 302. Both the originating drone 300 and the receiving drone 302 include a plurality of thrust devices 301, 303. In this embodiment, the originating drone 300 includes a movable transfer member 304 arranged above the fuselage 306. The transfer member 304 includes a set of transfer posts 308 that move the payload 26 from a first position within the fuselage 306 to a second position for transfer. In an embodiment, the transfer posts 308 are configured to extend through and are movable the fuselage 306. As will be discussed in more detail below, the extension of the transfer posts 308 through the fuselage 306 allows drones 300, 302 to use the transfer posts 308 for both passing and receiving the payload 26. In an embodiment, the transfer member 304 also includes a guide plate 309 that is movable between an open position (when receiving a payload) and a closes position (when flying or passing the payload). In an embodiment, the payload 26 is arranged within a cargo cage.

The receiving drone 302 includes a transfer member 310. In an embodiment, the receiving drone 302 is configured and constructed substantially identical to the originating drone 300. The drone 302 includes a transfer member 310 having a plurality of transfer posts 311 that are movable between a raised position over the fuselage 312 and a lowered position. The transfer member 310 further includes a guide plate 313 that is movable between a closed position and an open position. In an embodiment, the guide plate 313 is includes a plurality of plates.

Figure 18A:
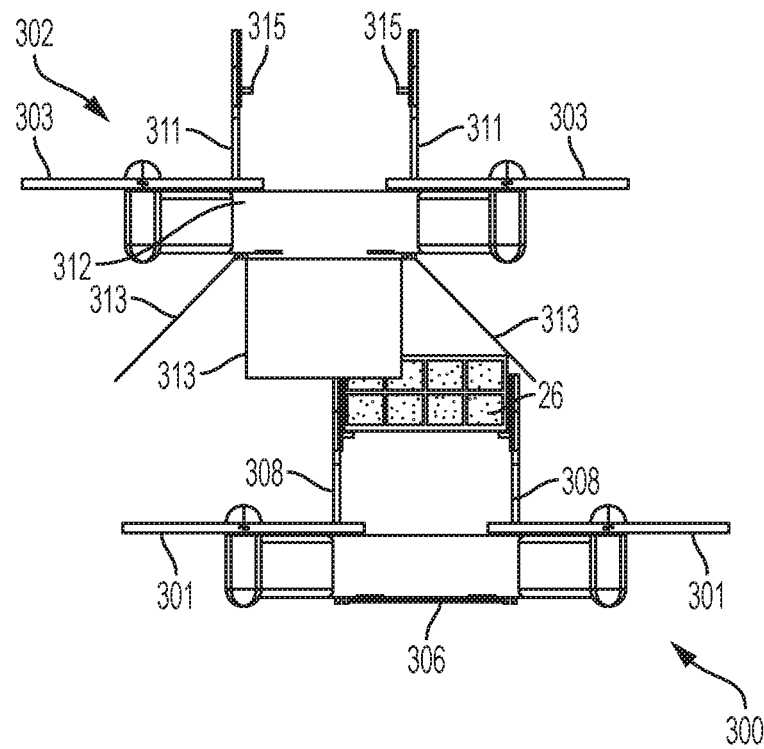
FIG. 18A, FIG. 18B, FIG. 18C and FIG. 18D depict an in-flight sequence of the transfer of a payload between the pair of autonomous drones of FIG. 17.

Referring now to FIGS. 14A-14D, the sequence or process for transferring the payload between the originating drone 300 and the receiving drone 302 is shown. After performing the identification authentication discussed herein, the drones 300, 302 first prepare and reconfigure for the transfer. The originating drone 300 extends the transfer posts 308 causing the payload 26 to move from within the fuselage 306 to a position vertically above the fuselage 306 (FIG. 18A). At this point, the receiving drone 302 also opens the guide plates 313 to define an opening in the fuselage 312 that is sized to receive the package 26.

Figure 18B:
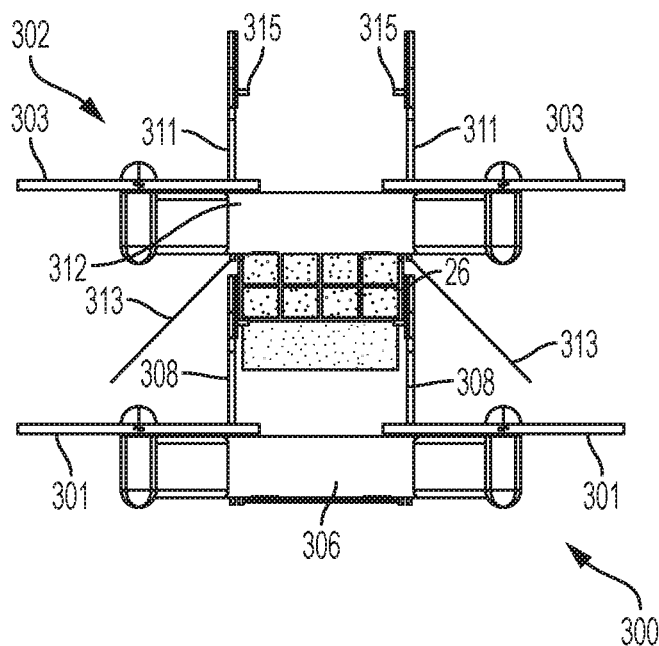
Figure 18C:
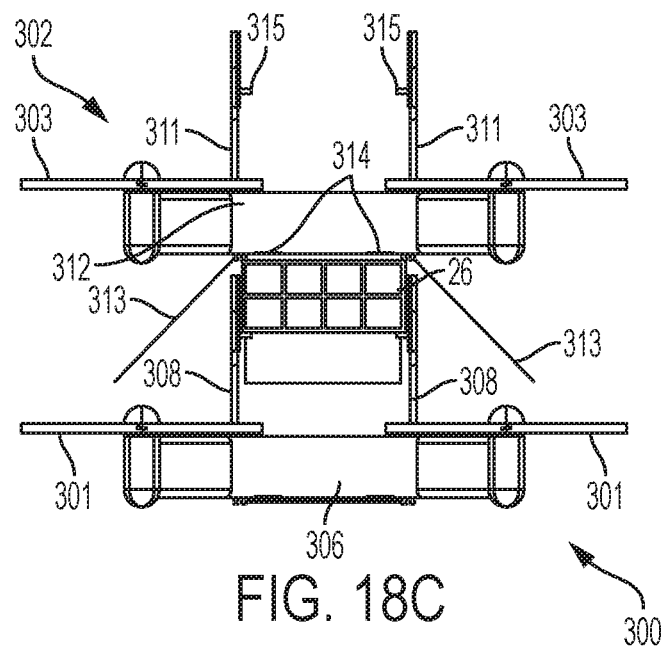
Figure 18D:
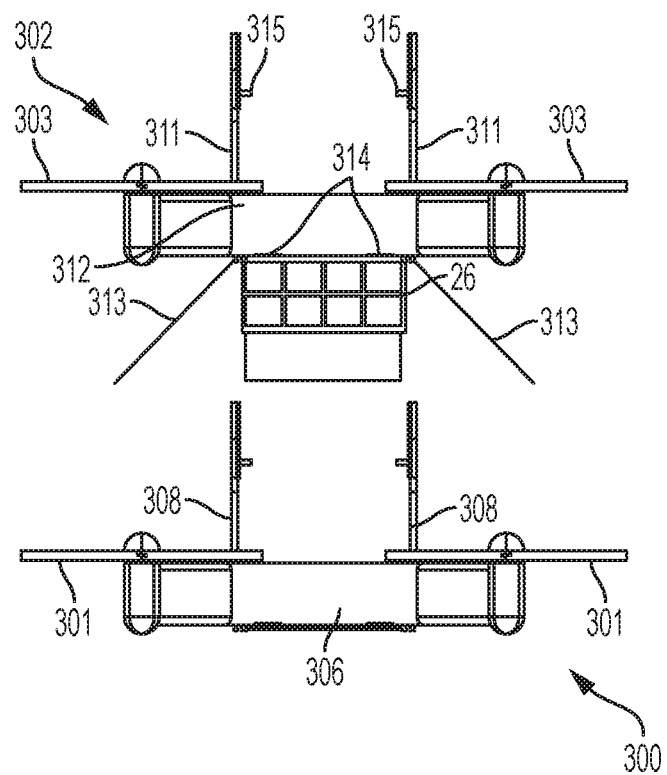

Next the drones 300, 302 align vertically to each other. As the receiving drone 302 lowers over the originating drone 300, the guide plates align the elevated cargo cage on originating drone 300 with cargo hold in the fuselage 312 (FIG. 18B). As the receiving drone 302 approaches the payload 26, locking plates 314 (FIG. 18C) engage the cargo cage of payload 26. The locking plates 314 secure the payload to the receiving drone 302. Once the locking plates 314 are engaged with the top of the cargo cage, the originating drone 300 releases the cargo cage. With the payload 26 secured to the receiving drone 302, the drones 300, 302 disengage and separate (FIG. 18D).

Figure 19A:
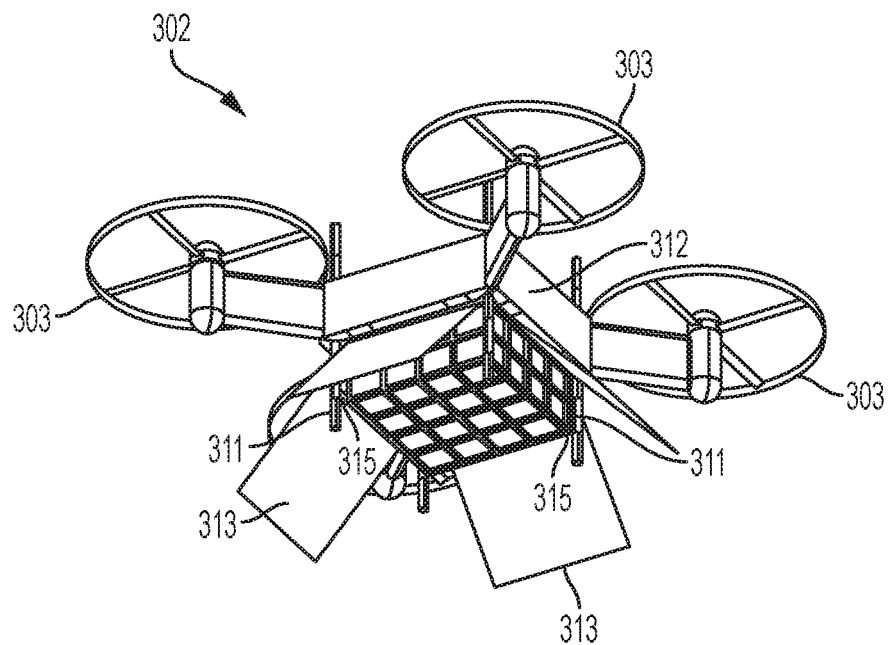
FIG. 19A, FIG. 19B, FIG. 19C and FIG. 19D depict an in-flight sequence for securing the payload transferred between the pair of autonomous drones of FIG. 17.
Figure 19B:
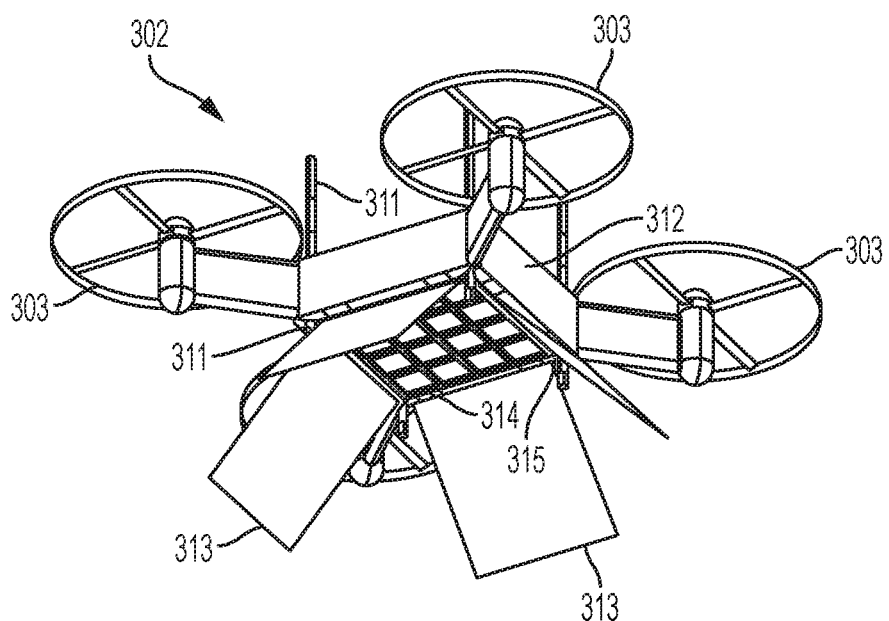

In an embodiment, at the point of separation, the payload 26 is disposed vertically below the receiving drone 302. Referring now to FIGS. 19A-19D, a sequence of process for securing the stowing the payload 26 within the receiving drone 302. To stow the payload 26, the drone 302 first lowers the transfer posts 311 to a lowered position extending below the fuselage 312. Each transfer post 311 includes a latch member 315 that engages and locks onto the cargo cage of payload 26 (FIG. 19A). The transfer posts 311 are then moved raising the payload 26 into the cargo area within the fuselage 312. It should be appreciated that before the payload 26 is raised, the latching plates 313 are disengaged and then re-engaged when the payload 26 is within the fuselage 312. In an embodiment, after the latching plates 313 are re-engaged the transfer posts 311 are lowered to an intermediate position.

Figure 19C:
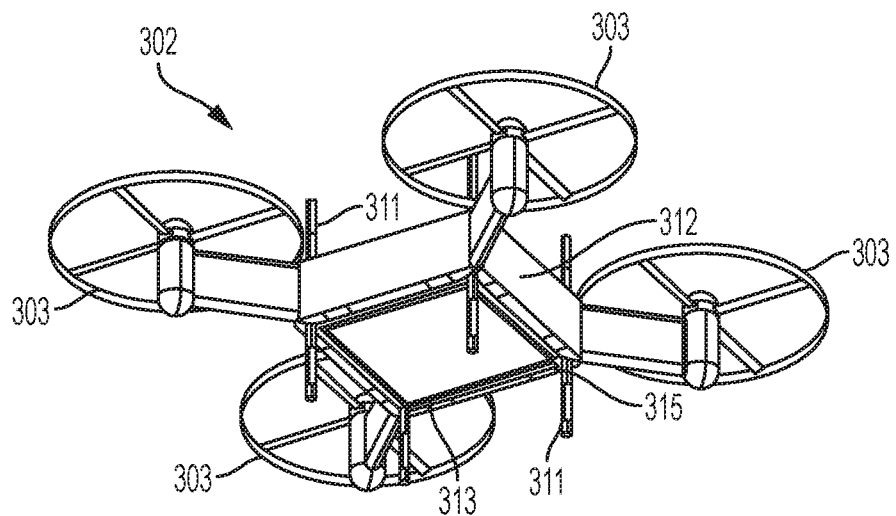
Figure 19D:
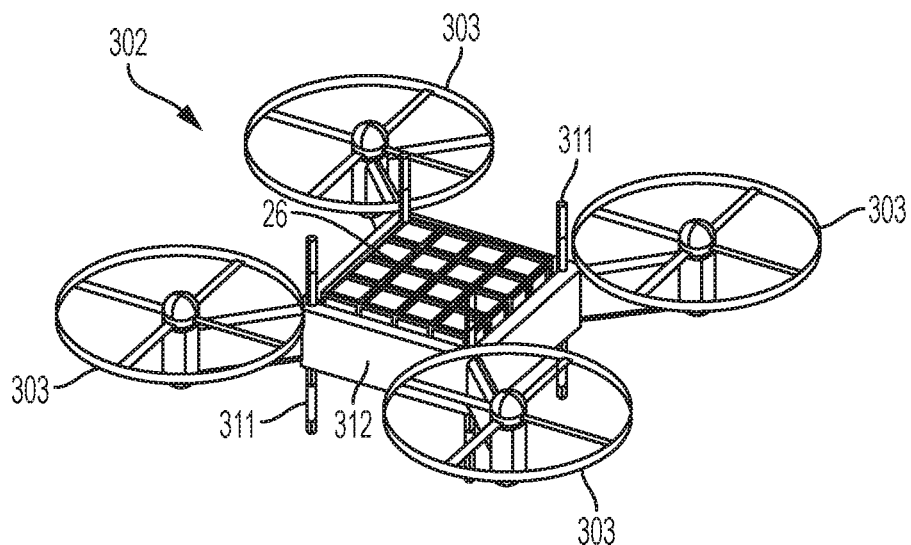

The guide plates 313 are then moved to a closed position, enclosing the bottom of the fuselage 312 (FIG. 19C). At this point, the payload 26 is secured and the drone 302 is ready to continue the delivery process (FIG. 19D).

Figure 20:
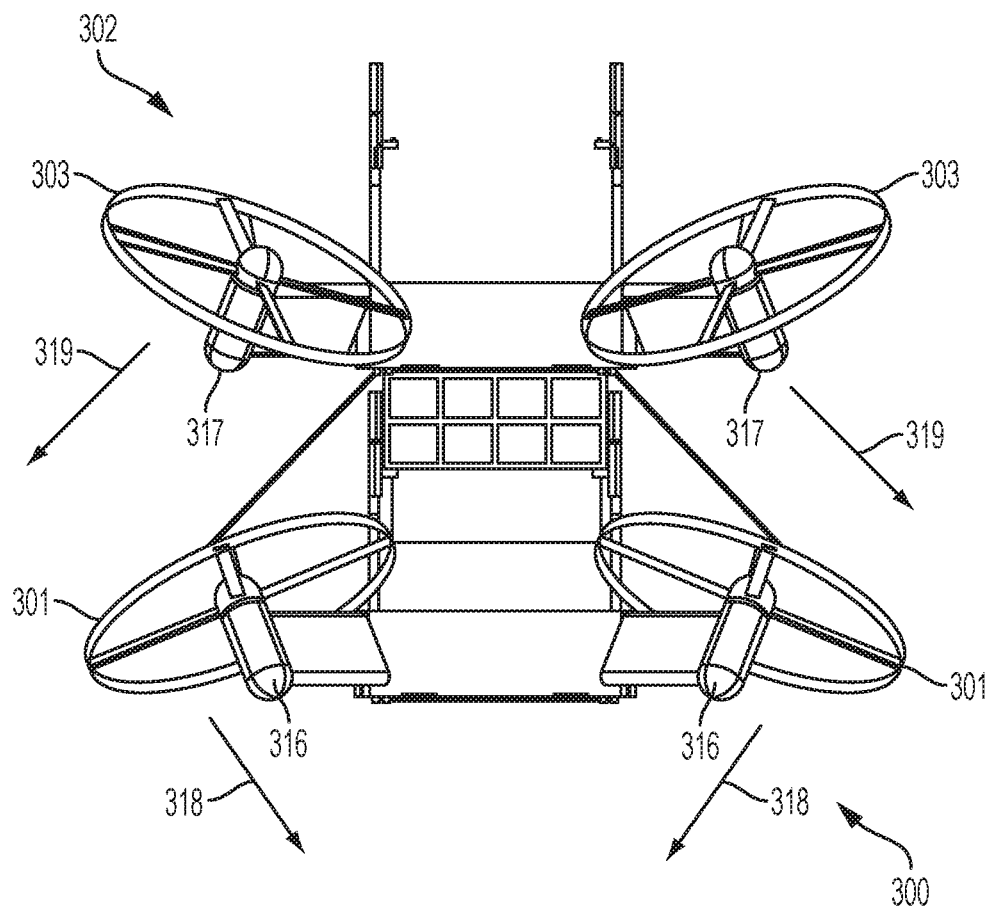
FIG. 20 depicts a pair of autonomous drones having tilting rotors in accordance with some embodiments of this disclosure.

In some embodiments, one issue that may be encountered with vertical package transfer configuration is the thrust/lift reduction for the thrust devices 301 on the lower drone 300 shown in FIG. 20 while it is hovering below the upper drone 302 due to the airflow caused by the thrust devices 303. In one embodiment, the reduction in thrust/lift for the thrust devices 301 on the lower drone 300 can be compensated by increasing the rotor speed of the thrust device 301. In another embodiment the reduction in thrust/lift for the thrust devices 301 on the lower drone 300 can be compensated by adjusting the angled thrust device mounts 316, 317 on both drones 300, 302 to increase the clean air stream available to the rotors on the lower drone 300. The angling of the thrust device mounts 316 may be angled such that the downwash air flow is beneath the drone 300 as indicated by arrows 318. The thrust device mounts 317 are then angled in the opposite manner such that the downwash air flow is directed more outward as indicated by the arrows 319 and not directly onto the lower drone 300.

It should be appreciated that the transfer of a payload from drone 302 to drone 300 may also be accomplished by performing the transfer process in reverse.

Figure 21:
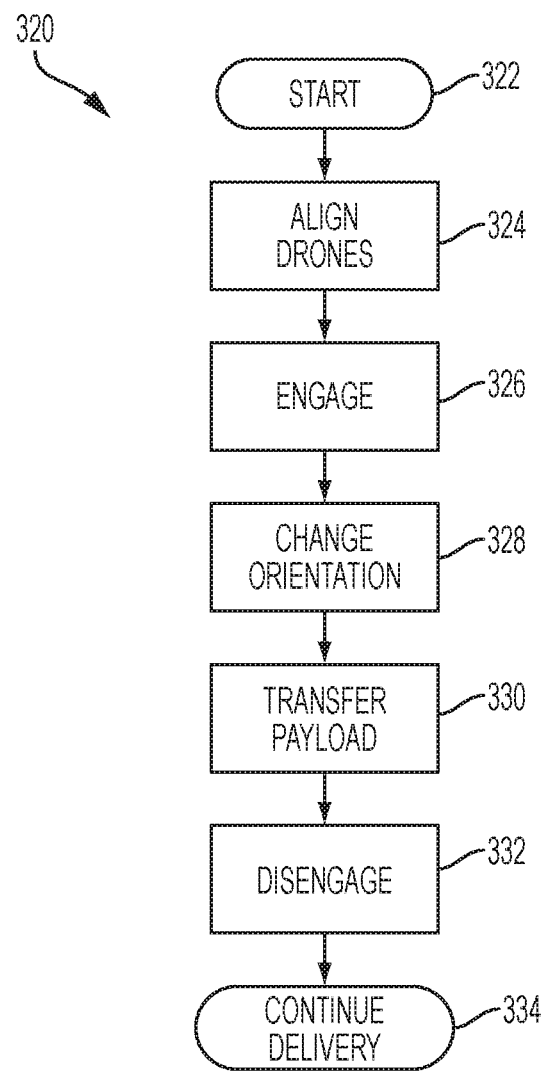
FIG. 21 depicts a flow diagram of a method of in-flight transfer of payloads between a pair of autonomous drones in accordance with some embodiments of this disclosure.

Referring now to FIG. 21, a method 320 is shown for the in-flight transfer of a payload between drones. The method starts in block 322 and proceeds to block 324 where the drones align themselves to each other. For example, where the drones have transfer arms, the transfer arms are extended and aligned. The method 320 then proceeds to block 326 where the transfer members engage each other to couple the drones together. In an embodiment, the drones communicate while engaged and cooperate to maintain a desired altitude and orientation. In another embodiment, the drones act in an arrangement wherein one of the drones assumes control of the combined operation of the coupled drones for the duration of the transfer.

The method 320 then proceeds to block 328 where the drones change orientation, such as increasing the altitude of the originating drone to create a slope or angled surface along the length of the engaged transfer arms. When the orientation is changed, a capture ring of a tether slides from the transfer arm of the originating drone to the transfer arm of the receiving drone. In an embodiment, the sliding of the capture ring occurs due to gravity. In another embodiment, the loop portion movement is caused by a member of either the originating drone or the receiving drone, such as a hook member for example. When the loop portion is coupled to the receiving drone, the originating drone releases the payload tether, allowing the payload to move under the influence of gravity. In some embodiments, the payload will fall away from the originating drone for a short distance before the tension of the tether connected to the receiving drone causes the payload to swing under the receiving drone.

With the payload transferred to the receiving drone, the method 320 proceeds to block 332 where the originating drone and receiving drone disengage. In the embodiment where one of the drones assumes control of both drones during transfer, the control for the other drone is released back to the controller of that drone prior to disengagement. The method 320 then proceeds to block 334 where the drones continue on with the delivery activity.

Figure 22:
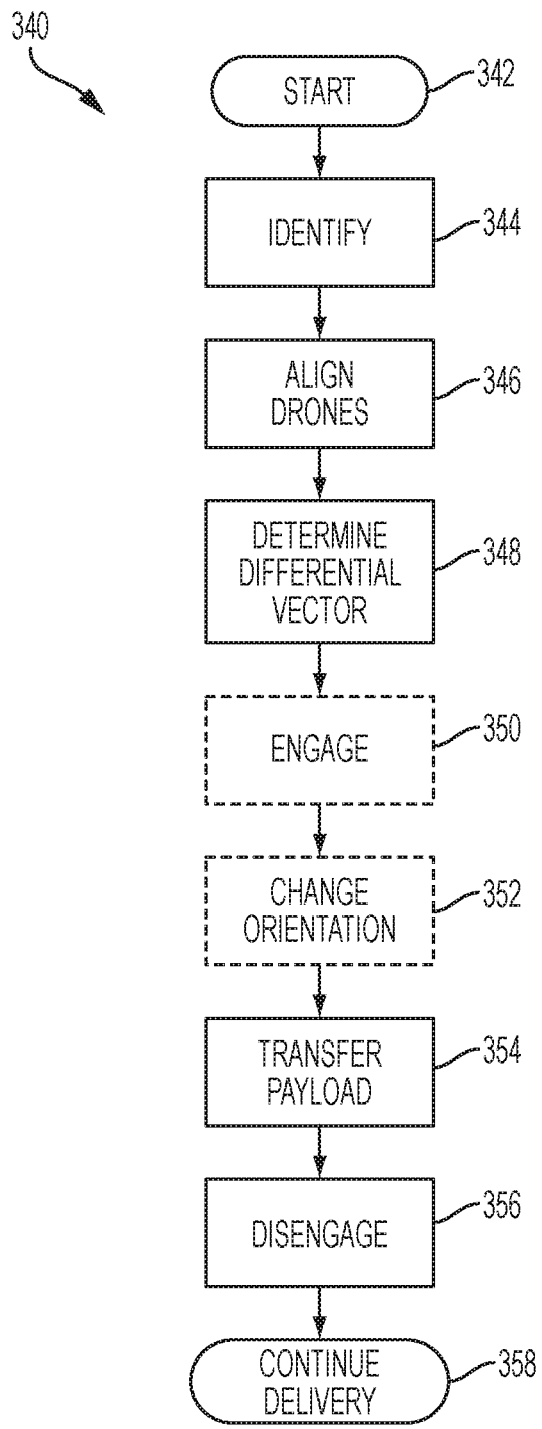
FIG. 22 depicts another flow diagram of a method of in-flight transfer of payloads between a pair of autonomous drones in accordance with some embodiments of this disclosure.

Referring now to FIG. 22, another method 340 is shown for the in-flight transferring of a payload from an originating drone to a receiving drone. In this embodiment, the method 340 starts in block 342 and proceeds to block 344 where the originating drone validates the identity of the receiving drone to ensure that the payload is being transferred to the correct drone. This identification may be performed using a radio frequency communication of an ID code for example. The method 340 then proceeds to block 346 where the drones are aligned to initiate the payload transfer. In block 348 the drone controllers determine a mass transfer time-dependent differential vector. The differential vector provides a model for the controllers to predict the impact of the transfer on the drones (such as for counterbalancing for example) and may also be used to define the orientation or other flight parameters that the drones will use to make the transfer efficient. In an embodiment, the method 340 then proceeds to block 350 where the originating drone and the receiving drone engage and are coupled together. The method 340 then proceeds to block 352 where the drones change orientation to allow the tether to move from the originating drone to the receiving drone. It should be appreciated that block 350 and block 352 may be omitted in embodiments where the drones do not engage each other, such as where the receiving drone has a transfer member with a net that catches the payload.

The method 340 then proceeds to block 354 where the payload is transferred from the originating drone to the receiving drone. Once the payload transfer is completed, the drones disengage in block 356. The method 340 ends in block 358 with the drone continuing the delivery activities.

It should be appreciated that while embodiments herein describe the package transfer process in terms of a transfer between a pair of aerial drones, the claims should not be so limited. In other embodiments, the transfer may be between an aerial drone and a stationary object, such as a roof of a building, a drone docking station or other structure configured to receive payloads. The transfer of the payload to a stationary structure while keeping the drone airborne provides similar advantages in efficiency of operation as between two aerial drones.

Technical effects and benefits of some embodiments include the efficient in-flight transfer of payloads from an originating drone to a receiving drone to allow the delivery of a payload where the originating drone is unable to travel to the end destination.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
    a first aerial drone having a first transfer member and a first controller, the first transfer member having a first coupling device on one end, the first transfer member being configured to carry a payload, the first controller including a processor configured to change a first altitude and first orientation of the first aerial drone;
    a second aerial drone having a second transfer member and a second controller, the second transfer member having a second coupling device on one end, the second transfer member being configured to receive the payload, the second controller including a processor configured to change a second altitude and a second orientation of the second aerial drone; and
    wherein the first controller and the second controller cooperate to change at least one of the first altitude, the second altitude, the first orientation and the second orientation to operably engage the first coupling device to the second coupling device for transferring the payload from the first transfer member to the second transfer member while the first aerial drone and second drone are in-flight.

2. The system of claim 1 wherein the first transfer member is a first arm extending from the first aerial drone and the second transfer member is a second arm extending from the second aerial drone.

3. The system of claim 2 further comprising a first tether slidably coupled on a first end to the first arm and coupled on an opposing end to the payload, wherein the first end is configured to slide from the first arm to the second arm when the first arm is engaged with the second arm.

4. The system of claim 3 wherein the first controller is configured to change the first orientation and the second controller is configured to change the second orientation to slide the first tether from the first arm to the second arm under an influence of gravity.

5. The system claim 2 wherein:
the first coupling device is a first electromagnet and the second coupling device is a second electromagnet; and
the first controller and the second controller cooperate to change polarities of the first electromagnet and the second electromagnet to engage and disengage the first electromagnet and the second electromagnet.

6. The system of claim 1 wherein:
the first aerial drone includes a movable first counterbalance member;
the second aerial drone includes a movable second counterbalance member;
the first controller is operably coupled to change a first position of the first counterbalance member in response to the payload transferring from the first aerial drone to the second aerial drone to maintain the first aerial drone at a first predetermined orientation; and
the second controller is operably coupled to change a second position of the second counterbalance member in response to the payload transferring from the first aerial drone to the second aerial drone to maintain the second aerial drone at a second predetermined orientation.

7. The system of claim 1 wherein the first transfer member includes a guide plate and a plurality transfer posts, the guide plate being movable between an open position and a closed position, the plurality of transfer posts being movable between a raised position and a lowered position.

8. The system of claim 1 wherein:
the first aerial drone includes a first plurality of thrust devices arranged to provide lift to the first aerial drone;
the second aerial drone includes a second plurality of thrust devices arrange to provide lift to the second aerial drone;
the first controller is operably coupled to the first plurality of thrust devices producing devices, the first controller being configured to change a first operation of at least one of the first plurality of thrust devices in response to the payload transferring from the first aerial drone to the second aerial drone to maintain the first aerial drone at a first predetermined orientation; and
the second controller is operably coupled to the second plurality of thrust devices, the second controller being configured to change a second operation of at least one of the second plurality of thrust devices in response to the payload transferring from the first aerial drone to the second drone to maintain the second aerial drone at a second predetermined orientation.

9. The system of claim 8 wherein:
the first controller is configured to determine a first mass transfer time-dependent differential vector based on the payload, and the first controller is further configured to change the first operation of at least one of the first plurality of thrust devices based at least in part on the first mass transfer time-dependent differential vector; and
the second controller is configured to determine a second mass transfer time-dependent differential vector based on the payload, and the second controller is further configured to change the second operation of at least one of the second plurality of thrust devices based at least in part on the second mass transfer time-dependent differential vector.

10. The system of claim 1 wherein at least one of the first aerial drone and the second aerial drone include a transfer sleeve having a pickup member disposed on one end, the transfer sleeve being disposed about one of the first transfer member or the second transfer member, the transfer sleeve being movable between a retracted position and an extended position.

11. An aerial drone comprising:
a fuselage;
a plurality of thrust producing devices coupled to the fuselage;
a transfer member coupled to the fuselage, the transfer member configured to move a payload to a second aerial drone; and
a controller operably coupled to the plurality of thrust producing devices, the controller including a processor that is responsive to executable computer instructions to adjust the plurality of thrust producing devices to change at least one of an orientation and altitude of the transfer member to move the payload to the second aerial drone.

12. The aerial drone of claim 11 further comprising a first tether slidably coupled to the transfer member on one end and the payload on an opposite end, and a second tether releasably coupled between the payload and the fuselage.

13. The aerial drone of claim 12 wherein the transfer member is an arm extending from the fuselage, the arm having a releasable coupler at an end.

14. The aerial drone of claim 11 wherein the first transfer member includes a guide plate and a plurality transfer posts, the guide plate being movable between an open position and a closed position, the plurality of transfer posts being movable between a raised position and a lowered position.

15. The aerial drone of claim 14 wherein the processor is further configured to determine a mass transfer time-dependent differential vector and to change the amount of lift produced by at least one of the plurality of thrust producing devices to move the payload to the second aerial drone.

16. A method of in-flight transferring of a payload between aerial drones, the method comprising:
providing a first aerial drone having a first transfer member;
providing a second aerial drone having a second transfer member;
changing at least one of an altitude and an orientation of at least one of the first aerial drone and the second aerial drone to position the first transfer member adjacent the second transfer member; and
moving the payload from the first aerial drone to the second aerial drone.

17. The method of claim 16 further comprising engaging a first end of the first transfer member to a second end of the second transfer member prior to moving the payload from the first aerial drone to the second aerial drone.

18. The method of claim 17 further comprising changing a first orientation of the first aerial drone and a second orientation of the second aerial drone to move a tether slidably coupled to the first transfer member to the second transfer member.

19. The method of claim 18 further comprising determining a mass transfer time-dependent differential vector and determining the first orientation and the second orientation based at least in part on the mass transfer time-dependent differential vector.

20. The method of claim 16 further comprising:
moving a guide plate on the second aerial drone to an open position to define a cargo area;
coupling the payload to the cargo area;
lowering a plurality of transfer posts;

latching the payload to the plurality of transfer posts; and
moving the plurality of transfer posts to a raised position.

\* \* \* \* \*